(12) United States Patent
Tan et al.

(10) Patent No.: US 12,705,847 B2
(45) Date of Patent: Aug. 11, 2026

(54) AUGMENTED CALL SPAWN CONFIGURATION FOR DIGITAL HUMAN REPRESENTATIONS IN AN ARTIFICIAL REALITY ENVIRONMENT

(71) Applicant: Meta Platforms Technologies, LLC, Menlo Park, CA (US)

(72) Inventors: Qinzi Tan, London (GB); Joshuah Vincent, Seattle, WA (US); Camila Cortes De Almeida E De Vincenzo, Seattle, WA (US); Ana Garcia Puyol, Mountain View, CA (US); Hayden Schoen, Evanston, IL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 223 days.

(21) Appl. No.: 18/473,648

(22) Filed: Sep. 25, 2023

(65) Prior Publication Data

US 2025/0104371 A1 Mar. 27, 2025

(51) Int. Cl.
*G06T 19/00* (2011.01)
*G06T 3/40* (2006.01)
(Continued)

(52) U.S. Cl.
CPC ................ *G06T 19/20* (2013.01); *G06T 3/40* (2013.01); *G06T 11/00* (2013.01); *G06T 19/006* (2013.01);
(Continued)

(58) Field of Classification Search
CPC . G06T 19/20; G06T 3/40; G06T 11/00; G06T 19/006; G06T 2200/16;
(Continued)

(56) References Cited

U.S. PATENT DOCUMENTS

| | | | |
|---|---|---|---|
| 6,559,863 | B1 | 5/2003 | Megiddo |
| 8,279,254 | B2 | 10/2012 | Goose et al. |

(Continued)

FOREIGN PATENT DOCUMENTS

| | | | |
|---|---|---|---|
| CA | 3039347 | A1 | 4/2018 |
| CN | 103250410 | A | 8/2013 |

(Continued)

OTHER PUBLICATIONS

Baxter D.B., "Creating Treemap Chart Using JavaScript," AnyChart News, Aug. 1, 2019, 12 Pages.

(Continued)

*Primary Examiner* — Haoshian Shih
(74) *Attorney, Agent, or Firm* — Morgan, Lewis & Bockius LLP

(57) ABSTRACT

Aspects of the present disclosure are directed to spawning digital human representations (DHRs) for use in various types of augmented calls in an artificial reality (XR) environment. A DHR can include a two-dimensional (2D) image of a user, a video of the user, or an avatar of the user. A first call type can include a compact mode call used in situations requiring multitasking, such that a caller can interact with an XR environment while attending to tasks in the real-world. A second call type can include a spatial mode call that can fully immerse a caller within an XR environment. The XR environment can be a multitasking environment in which a user can interact with multiple XR experiences, virtual objects, and DHR(s) of other user(s). Spatial mode calling can provide more natural face-to-face interaction between callers.

20 Claims, 24 Drawing Sheets

(51) Int. Cl.
*G06T 11/00* (2006.01)
*G06T 19/20* (2011.01)

(52) U.S. Cl.
CPC ...... *G06T 2200/16* (2013.01); *G06T 2200/24* (2013.01); *G06T 2219/024* (2013.01); *G06T 2219/2016* (2013.01)

(58) Field of Classification Search
CPC ........... G06T 2200/24; G06T 2219/024; G06T 2219/2016
See application file for complete search history.

(56) References Cited

U.S. PATENT DOCUMENTS 8,537,196 B2 9/2013 Hegde et al.
8,581,958 B2 11/2013 Baker et al.
8,675,067 B2 3/2014 Chou et al.
9,338,404 B1 5/2016 Egeler et al.
9,401,095 B2 7/2016 Kubota et al.
9,460,340 B2 10/2016 Kauffmann et al.
9,841,814 B1 12/2017 Kallmeyer et al.
9,959,676 B2 5/2018 Barzuza et al.
10,182,210 B1 1/2019 Goetzinger, Jr.
10,212,428 B2 2/2019 Trepte
10,298,587 B2 5/2019 Hook et al.
10,311,383 B2 6/2019 Holmes et al.
10,403,050 B1 9/2019 Beall et al.
10,499,033 B2 12/2019 Pesonen
10,554,931 B1 2/2020 Zavesky et al.
10,582,191 B1 3/2020 Marchak, Jr. et al.
10,664,772 B1 5/2020 Poel et al.
10,701,318 B2 6/2020 Valli
10,917,613 B1 2/2021 Chiarella et al.
10,952,006 B1 3/2021 Krol et al.
10,979,672 B1 4/2021 Krol et al.
11,140,361 B1 10/2021 Krol et al.
11,302,063 B2 4/2022 Cabral et al.
11,302,085 B2 4/2022 LeBeau et al.
11,394,925 B1 7/2022 Faulkner et al.
11,456,887 B1 9/2022 McCracken et al.
11,475,634 B2 10/2022 Atlas et al.
11,528,312 B2 12/2022 Oyman
11,556,172 B1 1/2023 Stevens et al.
11,563,779 B2 1/2023 Copley et al.
11,831,814 B2 11/2023 Lebeau et al.
11,886,625 B1 1/2024 Trzynadlowski et al.
11,921,970 B1 3/2024 Hoover et al.
11,948,263 B1 * 4/2024 Rudman ................ G06V 20/20
2002/0158873 A1 10/2002 Williamson
2007/0279484 A1 12/2007 Derocher et al.
2009/0288007 A1 11/2009 Leacock et al.
2009/0300516 A1 12/2009 Jerrard-Dunne et al.
2010/0085416 A1 4/2010 Hegde et al.
2011/0107270 A1 5/2011 Wang et al.
2012/0192088 A1 7/2012 Sauriol et al.
2012/0204118 A1 8/2012 Lefar et al.
2012/0246582 A1 9/2012 Leacock et al.
2012/0317501 A1 12/2012 Milou
2013/0024785 A1 1/2013 Van Wie
2013/0031475 A1 1/2013 Maor et al.
2014/0085316 A1 3/2014 Narayanan
2014/0085406 A1 3/2014 Narayanan
2014/0096036 A1 4/2014 Mohler
2014/0306994 A1 * 10/2014 Brown ............... H04N 1/32101
345/633
2015/0215581 A1 7/2015 Barzuza et al.
2015/0271220 A1 9/2015 Kleiner et al.
2015/0279044 A1 10/2015 Kim et al.
2015/0317832 A1 * 11/2015 Ebstyne .................. G06F 3/012
345/633
2016/0050394 A1 2/2016 Segal
2016/0093108 A1 3/2016 Mao et al.
2016/0132221 A1 5/2016 Lasser et al.
2016/0155187 A1 6/2016 Paulrajan et al.
2016/0156584 A1 6/2016 Hum et al.
2016/0163070 A1 6/2016 Leacock et al.
2016/0353062 A1 12/2016 Ono et al.
2017/0257405 A1 9/2017 Lo et al.
2017/0357917 A1 12/2017 Holmes et al.
2018/0063480 A1 3/2018 Luks et al.
2018/0095635 A1 * 4/2018 Valdivia ............. G02B 27/0093
2018/0098059 A1 4/2018 Valdivia et al.
2018/0101989 A1 4/2018 Frueh et al.
2018/0139246 A1 5/2018 Rosenberg
2018/0144212 A1 5/2018 Burgos et al.
2018/0158246 A1 6/2018 Grau et al.
2018/0227138 A1 8/2018 Faulkner et al.
2018/0234671 A1 8/2018 Yang et al.
2018/0356885 A1 12/2018 Ross et al.
2019/0042640 A1 2/2019 Valeski
2019/0045157 A1 2/2019 Venshtain et al.
2019/0058870 A1 2/2019 Rowell et al.
2019/0130629 A1 5/2019 Chand et al.
2019/0171354 A1 6/2019 Dascola et al.
2019/0253667 A1 8/2019 Valli
2019/0279424 A1 9/2019 Clausen et al.
2019/0310757 A1 10/2019 Lee et al.
2019/0325658 A1 10/2019 Park et al.
2019/0327392 A1 10/2019 Sarkar
2019/0340828 A1 11/2019 Harvey
2019/0346522 A1 11/2019 Botnar et al.
2019/0371060 A1 12/2019 Energin et al.
2019/0379750 A1 12/2019 Zamora Duran et al.
2020/0090350 A1 3/2020 Cho et al.
2020/0099891 A1 3/2020 Valli et al.
2020/0118342 A1 4/2020 Varshney et al.
2020/0128033 A1 4/2020 Kawakita
2020/0142475 A1 5/2020 Paez et al.
2020/0154166 A1 5/2020 Rakshit et al.
2020/0279411 A1 9/2020 Atria et al.
2020/0294000 A1 9/2020 Sexauer et al.
2020/0296327 A1 9/2020 Karafin et al.
2020/0314385 A1 10/2020 Kang et al.
2020/0329214 A1 10/2020 Ahn et al.
2020/0371665 A1 11/2020 Clausen et al.
2020/0372140 A1 11/2020 Jaber et al.
2020/0396266 A1 12/2020 Goel
2021/0019541 A1 1/2021 Wang et al.
2021/0029326 A1 1/2021 Oyman et al.
2021/0099433 A1 4/2021 Soryal et al.
2021/0120066 A1 4/2021 Oyman et al.
2021/0149627 A1 5/2021 Jang et al.
2021/0248727 A1 8/2021 Fisher et al.
2021/0263593 A1 8/2021 Lacey
2021/0281802 A1 9/2021 Kirisken
2021/0336784 A1 10/2021 Athlur et al.
2021/0385412 A1 12/2021 Matula et al.
2021/0390767 A1 12/2021 Johnson et al.
2021/0392175 A1 12/2021 Gronau et al.
2021/0392296 A1 12/2021 Rabinovich et al.
2021/0407520 A1 12/2021 Neckermann et al.
2022/0084288 A1 3/2022 LeBeau et al.
2022/0086167 A1 3/2022 Lebeau et al.
2022/0086205 A1 3/2022 LeBeau et al.
2022/0103386 A1 3/2022 Jensen
2022/0109810 A1 4/2022 Kancharlawar et al.
2022/0116431 A1 4/2022 Mayfield et al.
2022/0150083 A1 5/2022 Faulkner
2022/0157342 A1 5/2022 Kliushkin et al.
2022/0172444 A1 6/2022 LeBeau et al.
2022/0174108 A1 6/2022 Oyman
2022/0200979 A1 6/2022 Wenzel
2022/0229535 A1 7/2022 Evangelista et al.
2022/0385490 A1 12/2022 Lin et al.
2022/0417308 A1 12/2022 Oyman
2023/0082461 A1 3/2023 Gal et al.
2023/0198745 A1 6/2023 Vansteenkiste et al.
2023/0244799 A1 8/2023 Sharma
2023/0281929 A1 9/2023 Atlas et al.
2023/0412724 A1 12/2023 Ma et al.

(56) References Cited

U.S. PATENT DOCUMENTS

| | | | |
|---|---|---|---|
| 2024/0070957 | A1 | 2/2024 | Cross et al. |
| 2024/0214524 | A1 | 6/2024 | Lebeau et al. |

FOREIGN PATENT DOCUMENTS

| | | | |
|---|---|---|---|
| CN | 104935868 | B | 4/2019 |
| CN | 113311958 | A | 8/2021 |
| WO | 2020117657 | A1 | 6/2020 |

OTHER PUBLICATIONS

EBook Reader, "Viewing Popular Highlights on Kindles," [Online], Feb. 15, 2018 [Retrieved on Aug. 5, 2020], 11 Pages, Retrieved from Internet: URL: https://blog.the-ebook-reader.com/2018/02/15/viewing-popular-highlights-on-kindles/.

Garofalakis J., et al., "Personalized Web Search by Constructing Semantic Clusters of User Profiles," Springer Link [Online], 2008 [Retrieved on Aug. 5, 2020], 6 Pages, Retrieved on Internet: URL: https://link.springer.com/chapter/10.1007/978-3-540-85565-1_30.

Gauch S., et al., "Ontology-Based User Profiles for Search and Browsing," [Online], 2002 [Retrieved on Aug. 5, 2020], 6 Pages, Retrieved from Internet: URL: https://www.semanticscholar.org/paper/Ontology-Based-User-Profiles-for-Search-and-Gauch-Chaffee/93af7304757a9beabb10bfbca55b04045bf2ef90.

Gupta K., et al., "Do You See What I See? The Effect ofGaze Tracking on Task Space Remote Collaboration," IEEE Transactions onVisualization and Computer Graphics, Nov. 2016, vol. 22, No. 11, pp. 2413-2422, DOI: 10.1109/TVCG.2016.2593778.

International Search Report and Written Opinion for International Application No. PCT/US2021/038992, mailed Oct. 29, 2021, 16 pages.

International Search Report and Written Opinion for International Application No. PCT/US2023/012192, mailed May 4, 2023, 8 pages.

Jikadra R., et al., "Video Calling with Augmented Reality Using WebRTC API," 2019 6th International Conference on Computing for Sustainable Global Development (INDIACom), Mar. 13, 2019, 5 pages.

"Pinterest Communities What are they and How can you Join?," Ivory Mix, Aug. 5, 2020, 19 Pages, Retrieved from Internet: URL: https://ivorymix.com/pinterest-communities/.

Schmeiser L., "Microsoft Analytics Aims to Analyze Worker Habits, Point to More Productivity," [Online], Jul. 5, 2017 [Retrieved on Aug. 5, 2020], 3 Pages, Retrieved from Internet: URL: https://www.itprotoday.com/office-365/microsoft-analytics-aims-analyze-worker-habits-point-more-productivity.

Semantic Arts, "White Paper: Semantic Profiling," [Online], Jan. 21, 2015 [Retrieved on Aug. 5, 2020], 11 Pages, Retrieved from Internet: https://www.semanticarts.com/white-paper-semantic-profiling/.

Shanmugam M., et al., "Research Opportunities on Virtual Reality and Augmented Reality: A Survey," 2019 IEEE International Conference on System, Computation, Automation and Networking (ICSCAN), Mar. 29, 2019, 6 pages.

Song X., et al., "A Scalable and Statistically Robust Beam Alignment Technique for mm-Wave Systems," May 8, 2018, 13 pages.

Tarpani G., "What is Google Wave?," Macworld [Online], Feb. 22, 2010 [Retrieved on Aug. 5, 2020], 7 Pages, Retrieved from Internet: URL: https://www.macworld.com/article/1146555/whatisgooglewave.html.

Unknown., "A Better Way to Meet Online," Gather, https://www.gather.town/ , Last Accessed Oct. 11, 2021.

Wanders I., "Build your Own Knowledge Graph: From Unstructured Dark Data to Valuable Business Insights," Vector Consulting [Online], Oct. 18, 2018 [Retrieved on 2020-80-05], 8 Pages, Retrieved from Internet: https://medium.com/vectrconsulting/build-your-own-knowledge-graph-975cf6dde67f.

Wikipedia, The Free Encyclopedia, "Google Wave," [Online], Aug. 5, 2020, 1 Page, Retrieved from Internet: URL: https://simple.wikipedia.org/wiki/Google_Wave.

Wikipedia, The Free Encyclopedia, "Treemapping," Aug. 5, 2020, 13 Pages, Retrieved from Internet: URL: https://en.wikipedia.org/wiki/Treemapping.

Wikipedia: The Free Encyclopedia, "Unconference," Aug. 5, 2020, 3 Pages, Retrieved from Internet: URL: https://en.wikipedia.org/wiki/Unconference.

International Preliminary Report on Patentability for International Application No. PCT/US2023/012192, mailed Aug. 15, 2024, 6 pages.

International Preliminary Report on Patentability for International Application No. PCT/US2022/042452, mailed Mar. 14, 2024, 6 pages.

Gunkel S.N.B., et al., "360-Degree Photo-realistic VR Conferencing," 2019 IEEE Conference on Virtual Reality and 3D User Interfaces (VR), 2019, 2 pages.

Office Action mailed Jul. 7, 2025 for European Patent Application No. 22777850.3, filed on Sep. 2, 2022, 8 pages.

Office Action mailed Sep. 12, 2025 for Taiwan Application No. 111129003, filed Aug. 2, 2022, 15 pages.

* cited by examiner

AUGMENTED CALL SPAWN CONFIGURATION FOR DIGITAL HUMAN REPRESENTATIONS IN AN ARTIFICIAL REALITY ENVIRONMENT

TECHNICAL FIELD

The present disclosure is directed to spawning digital human representations (DHRs) in different augmented call modes.

BACKGROUND

Video conferencing has become a major way people connect. From work calls to virtual happy hours, webinars to online theater, people feel more connected when they can see other participants, bringing them closer to an in-person experience. However, video calls remain a pale imitation of face-to-face interactions. Understanding body language and context can be difficult with only a two-dimensional ("2D") representation of a sender. Further, interpersonal interactions with video are severely limited as communication often relies on relational movements between participants.

In recent years, the fields of virtual reality (VR) and augmented reality (AR) have gained significant attention due to their potential to revolutionize the way people interact with digital content. These technologies enable users to experience immersive digital environments in a way that was previously impossible. Virtual reality typically involves the use of a headset or other device that fully blocks out the user's physical surroundings and replaces them with a digital world. Augmented reality, on the other hand, overlays digital information on top of the user's real-world environment. Both VR and AR have numerous applications in fields such as entertainment, education, training, and healthcare. For example, VR can be used to simulate dangerous or complex scenarios for training purposes, while AR can provide real-time information and guidance to workers in industrial settings. Mixed reality (MR) systems can allow light to enter a user's eye that is partially generated by a computing system and partially includes light reflected off objects in the real-world. AR, MR, and VR (collectively XR) experiences can be observed by a user through a head-mounted display (HMD), such as glasses or a headset.

Some XR systems provide the ability for users to engage in 3D video calls, where a call participant can see a 2D or 3D representation of one or more other call participants. In such 3D calls, users can experience interactions that more closely mimic face-to-face interactions. For example, an XR device can include a camera array that captures images of a call sender, can reconstruct a hologram or avatar (3D model) representation of the call sender, can encode the 3D model for delivery to an XR device of a call receiver, which can decode and display the 3D model in the XR environment of the call receiver.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
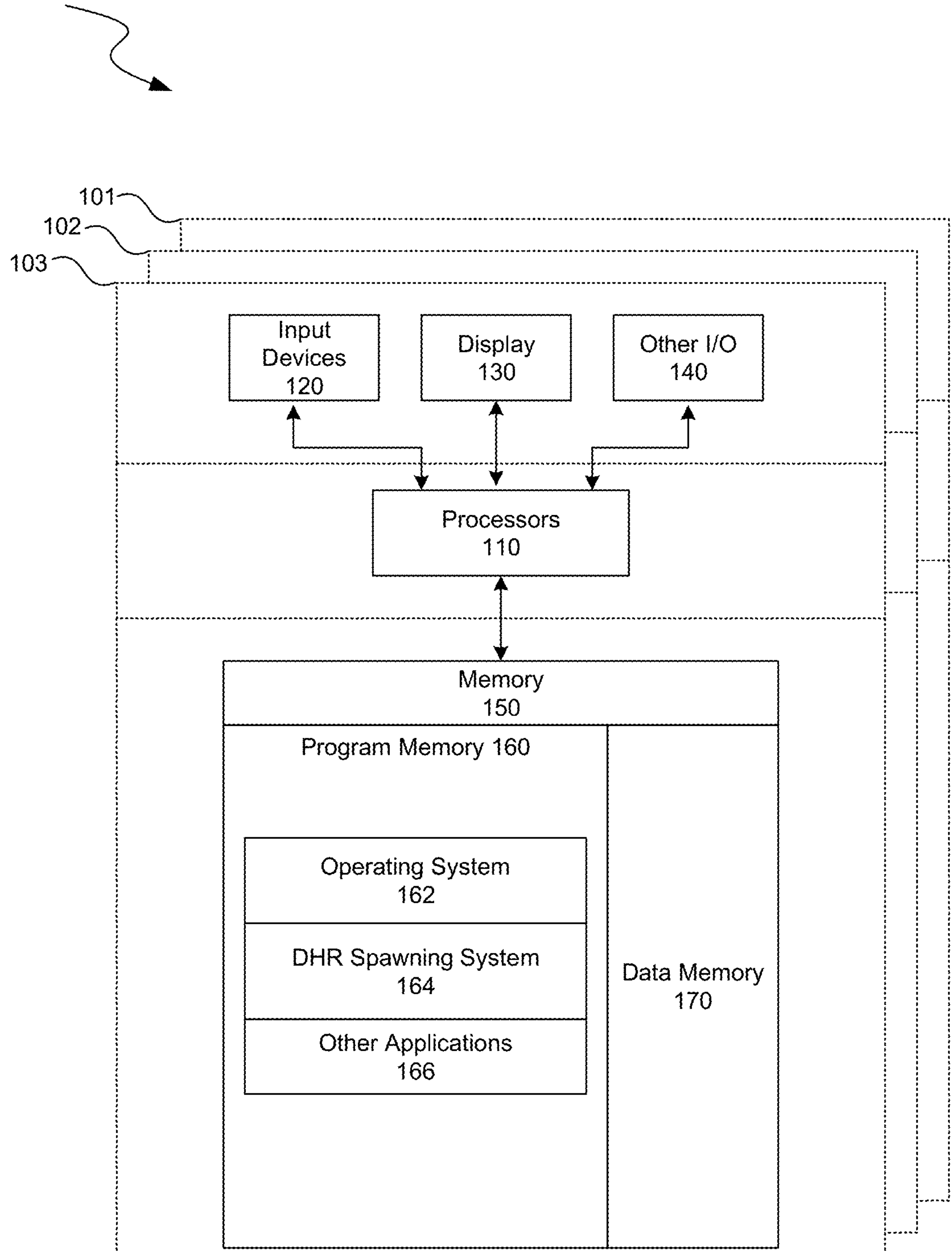
FIG. 1 is a block diagram illustrating an overview of devices on which some implementations of the present technology can operate.

Aspects of the present disclosure are directed to spawning digital human representations (DHRs) in an artificial reality (XR) environment for use in various augmented call modes.

A DHR can be a two-dimensional (2D) image associated with a user (e.g., depicting the user, an avatar, an icon, or other representation), a video of the user, or a two-dimensional (2D) or three-dimensional (3D) avatar of the user, and can be used in a compact mode call and/or a spatial mode call. In some implementations, a caller can initiate a compact mode call with a user having a displayed DHR and transition to a spatial mode call with the same user having the same DHR. A compact mode call can be used in situations requiring multitasking, such that a caller can interact with the XR environment while attending to tasks in the real-world. A spatial mode call can fully immerse a caller within an XR environment, where the XR environment can be a general multitasking environment (such as an AR or MR environment) in which a user can interact with multiple XR experiences and DHRs of other users. In a spatial mode call, avatar DHRs and video DHRs can be rendered at a scale that is more life-sized in nature. Spatial mode calling can provide more natural face-to-face interaction between callers, can cause DHRs to appear consistently in known locations of a shared space or environment, and can respect reality and the way users behave in reality (e.g., body size, height, pose, movement, etc.).

To initiate a compact mode call, a user can navigate a contact list or otherwise select a contact means displayed on an XR device, such as a telephone number, email address, a username, a device identifier, or other locator of a call receiver or call receiver's device. For example, the user can access a list of friends or followers on the XR device. Upon selecting a contact, the user can initiate a compact mode call between the user (i.e., the call sender), and the selected call receiver, using a DHR. In some implementations, it is contemplated that the call sender can initiate a group augmented call with multiple call receivers, and/or can add additional call receivers from within the augmented call.

In some implementations, a DHR type for the call sender can be selected manually by the call sender via the call sender's XR device. In some implementations, a DHR type for the augmented call (i.e., both call sender and call receiver) can be selected manually by the call sender. In some implementations, a DHR type for the call sender and/or call receiver can be determined automatically by analyzing the capabilities associated with the call sender's XR device and the call receiver's device (e.g., an XR device or other computing device, such as a mobile phone, a computer, a tablet, etc.). The hardware, software, network, and/or device requirements to enable or utilize a 2D image DHR type, avatar DHR type, and video DHR type can be different, limiting which DHRs can be used on either the call sender's side, the call receiver's side, or both. For example, an avatar DHR type may require a more capable communication network in terms of bandwidth and latency than a less capable communication network capable of supporting audio and a 2D image DHR type. Once the DHR type(s) are determined, the DHRs can be spawned (e.g., rendered overlaid on a view of a real-world environment). In examples, the DHR of the call receiver can be spawned and displayed to the call sender while the DHR of the call sender can be spawned and displayed to the call receiver. In some implementations, the DHR type for the call sender can be different than the DHR type for the call receiver. For example, the call sender can be represented as a 3D avatar on the call receiver's XR device, while the call receiver be represented as a still image on the call sender's XR device, both with streaming audio.

In some implementations, a caller can transition from a compact mode call to a spatial mode call. For a spatial mode call, the DHRs can be spawned in an XR environment in accordance with a spawning location. The spawning location can be based on a spatial anchor that is common to DHRs in the XR environment. As used herein, a "spatial anchor" can be a common frame of reference for the call sender and the call receiver, enabling the users to, e.g., place virtual objects and see each other's DHRs relative to the same location. Thus, the virtual objects and DHRs can be seen and/or interacted with by the call sender and the call receiver in the same orientation and position.

Other spawning parameters, such as the height of the DHR can be based on a height of the user and whether the user is within the field-of-view of one or more imaging devices (e.g., cameras) integral with or in operable communication with a DHR experience system. For example, the DHR experience system can serve as a stage for spawning DHRs and provide an imaging device to obtain a user's feature information (e.g., body movement information) and video information. In some implementations, the DHR experience system can be external to an XR head-mounted display (HMD) used to render the augmented call. DHRs can be positioned around the stage (e.g., in a circle configuration) when the DHR is spawned at a height that best respects reality and the way people behave in reality. For example, avatar DHRs can be positioned such that the DHRs are spawned and/or positioned in a face-to-face or eye-to-eye manner. That is, in some implementations, faces associated with avatar DHRs can be positioned at the same height within the XR environment.

Although DHRs can enter the XR environment by being spawned around the spawning circle, the DHRs are not locked to the spawning circle and can move around the XR environment. However, DHRs that enter the XR environment can be spawned at the spawning circle such that users appear at a common and known location within the XR environment. In some implementations, DHRs other than avatars can be spawned within the XR environment (e.g., 2D images or video streams of users). In some instances, spawning parameters for one DHR may be different than spawning parameters for another DHR.

While described herein as a "call sender" and "call receiver" (and the like), augmented calls are two-way, so each side of the call can act as both a call sender and a call receiver. The description herein of a system acting in its sending capacity can capture image data, video data, movement data, and/or audio data and transmit a version of it to a recipient side where it is rendered by the call receiver's device. However, each call participant can be simultaneously acting in both a sending and receiving capacity.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real-world. For example, a MR headset could be shaped as a pair of glasses with a pass-through display, which allows light from the real-world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some implementations provide specific technological improvements in the field of augmented calling. For example, based on capabilities of a call sender's XR device and/or the call receiver's device, the optimal type of DHR can be recommended to a call sender and/or automatically selected and utilized in the augmented call. Further, the ability to inherit DHR type information when transitioning from a compact mode call to a spatial mode call can improve overall user experience, as configuration and/or call setup information does not repeatedly need to be input by the user.

In addition, the spawning process described herein can reduce spawning collisions when a user participates in a shared XR environment. Spawning a DHR in a shared XR environment can lead to DHR viewing problems if the creation of the DHRs do not follow a common set of rules. In some implementations, the common set of rules can be established to ensure that DHRs are created at locations unlikely to cause collision problems and at positions where others in the shared XR environment can view the DHRs. For example, a spawning circle can be utilized to avoid spawning collisions when new DHRs are added to the XR environment. In some implementations, a height of the DHR can be based on external information, such as XR HMD information or DHR experience system information (including the imaging device capturing images of the call sender) to ensure that other users can view DHR content when in the XR environment.

Further, some implementations can detect the capabilities of the sender's XR device and the receiver's device in the augmented call to automatically select DHR types based on, for example, capturing capabilities and streaming capabilities on the call sender device, and/or downloading and rendering capabilities on the call receiver device. For example, if the call sender's XR device is low on power, has low network bandwidth, and/or low available processing power, some implementations can automatically select a 2D image DHR type, instead of capturing and streaming a video or avatar DHR type. In another example, if a call sender manually selects an avatar DHR type, but the call sender's XR device has low battery power, a static avatar can be used that lip synchs to the captured audio, instead of the sender's XR device capturing and animating the avatar according to the call sender's actual movements and expressions. Thus, some implementations result in conservation of power and processing resources on the respective devices, and/or conservation of available network resources.

Several implementations are discussed below in more detail in reference to the figures. FIG. 1 is a block diagram illustrating an overview of devices on which some implementations of the disclosed technology can operate. The devices can comprise hardware components of a computing system 100 that spawns digital human representations (DHRs) in connection with compact mode and spatial mode augmented calls in an XR environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device.

Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, DHR spawning system 164, and other application programs 166. Memory 150 can also include data memory 170 that can include, e.g., caller profile information, device capability information, DHR information, default spawning parameters, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
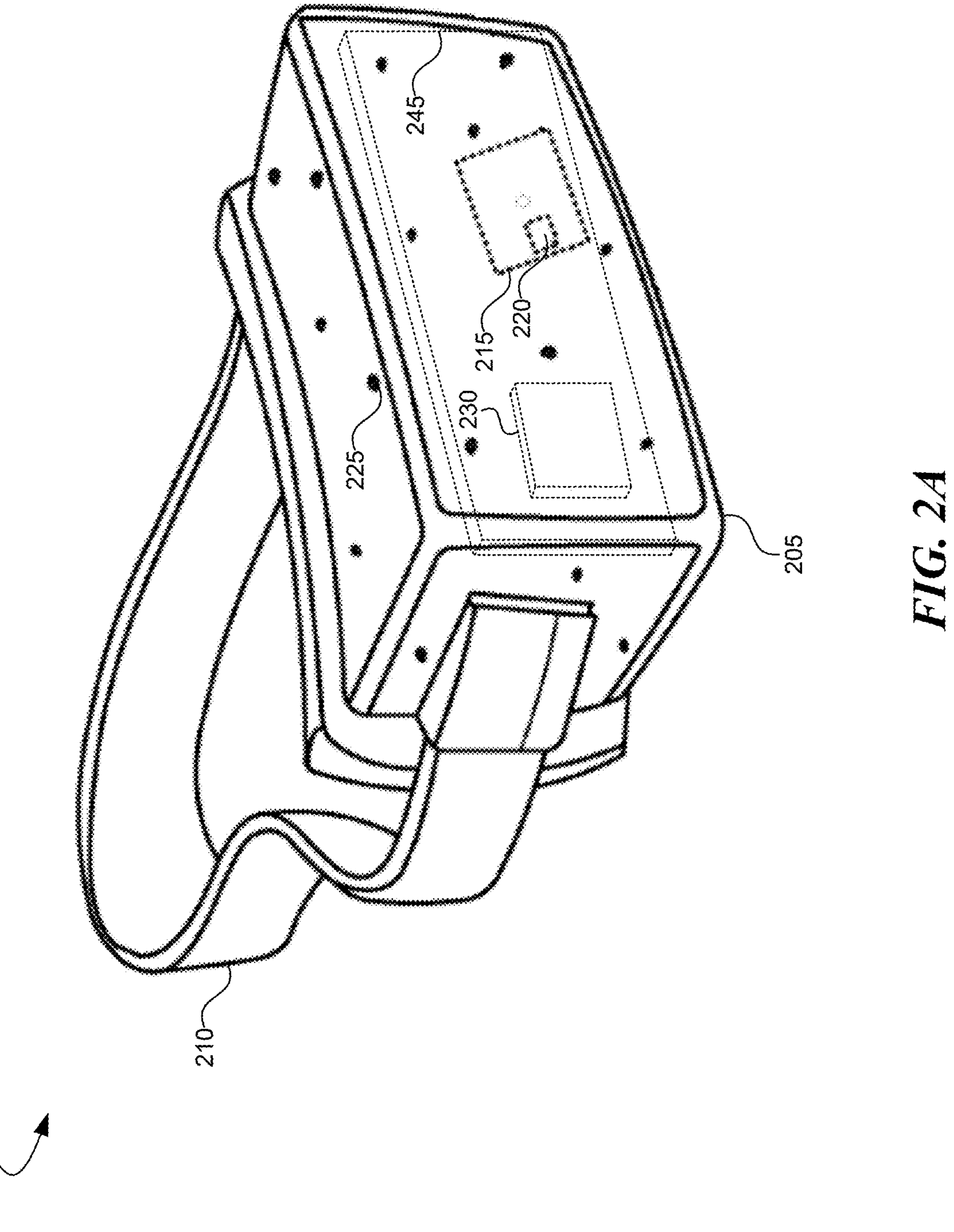
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
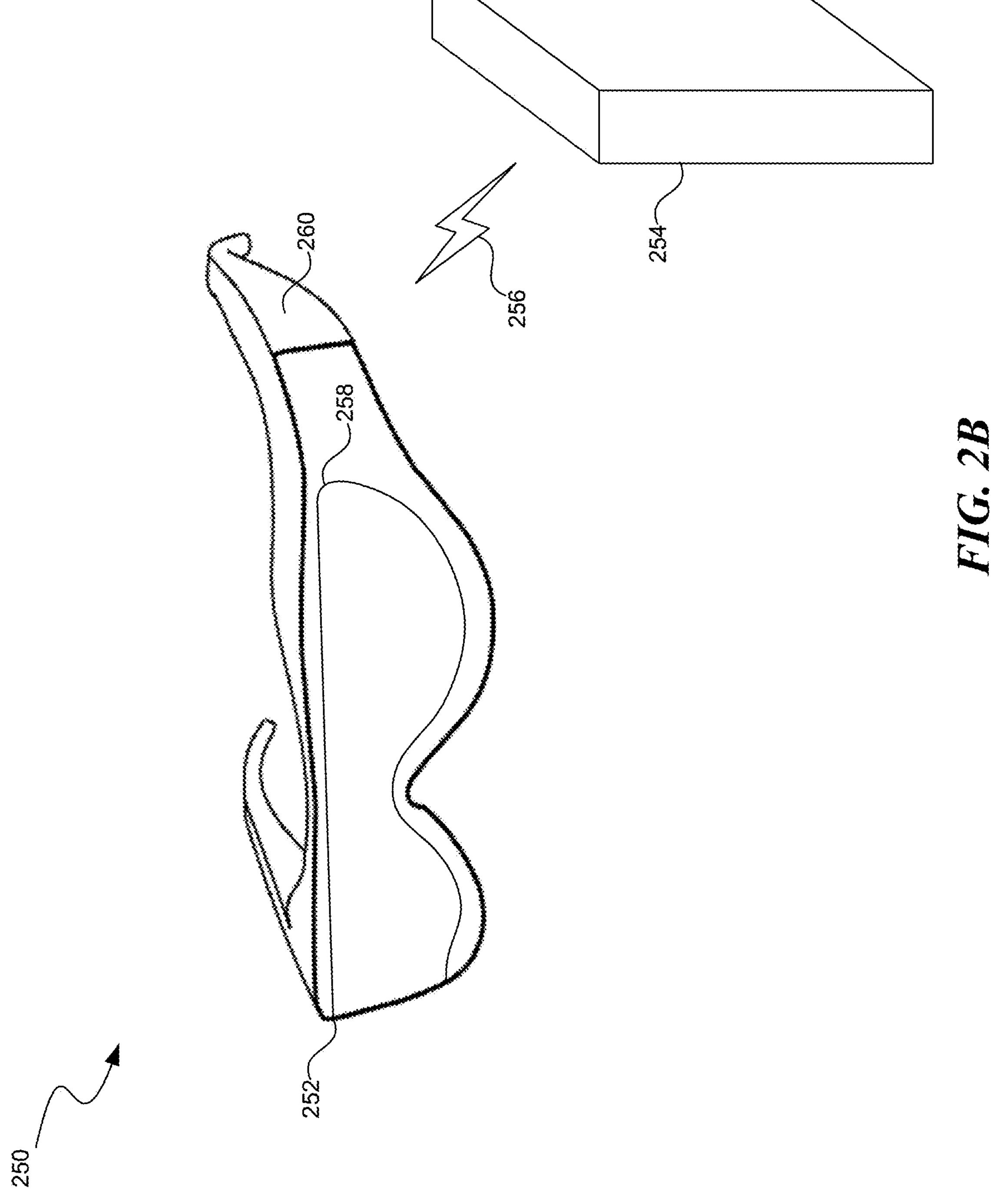
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
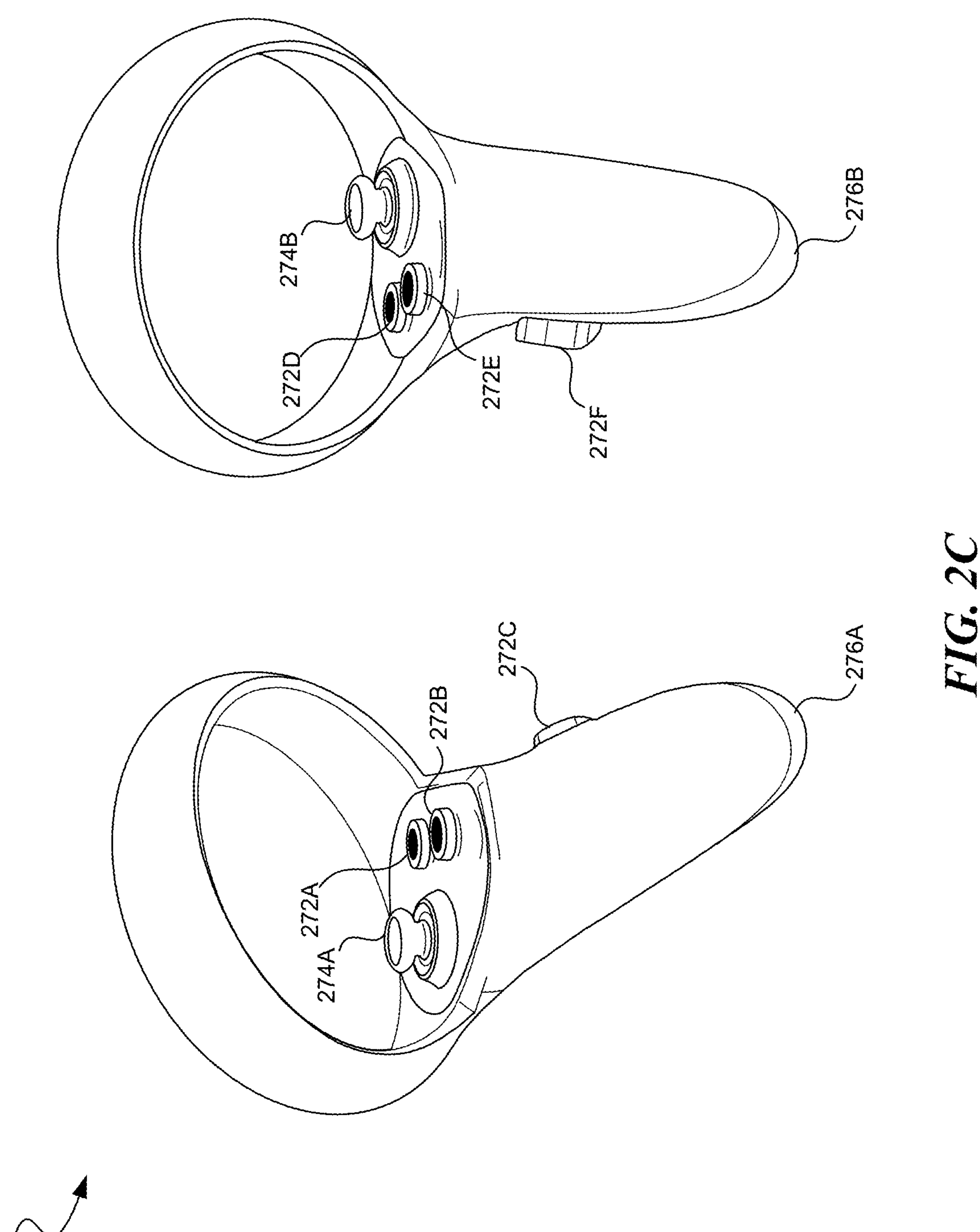
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
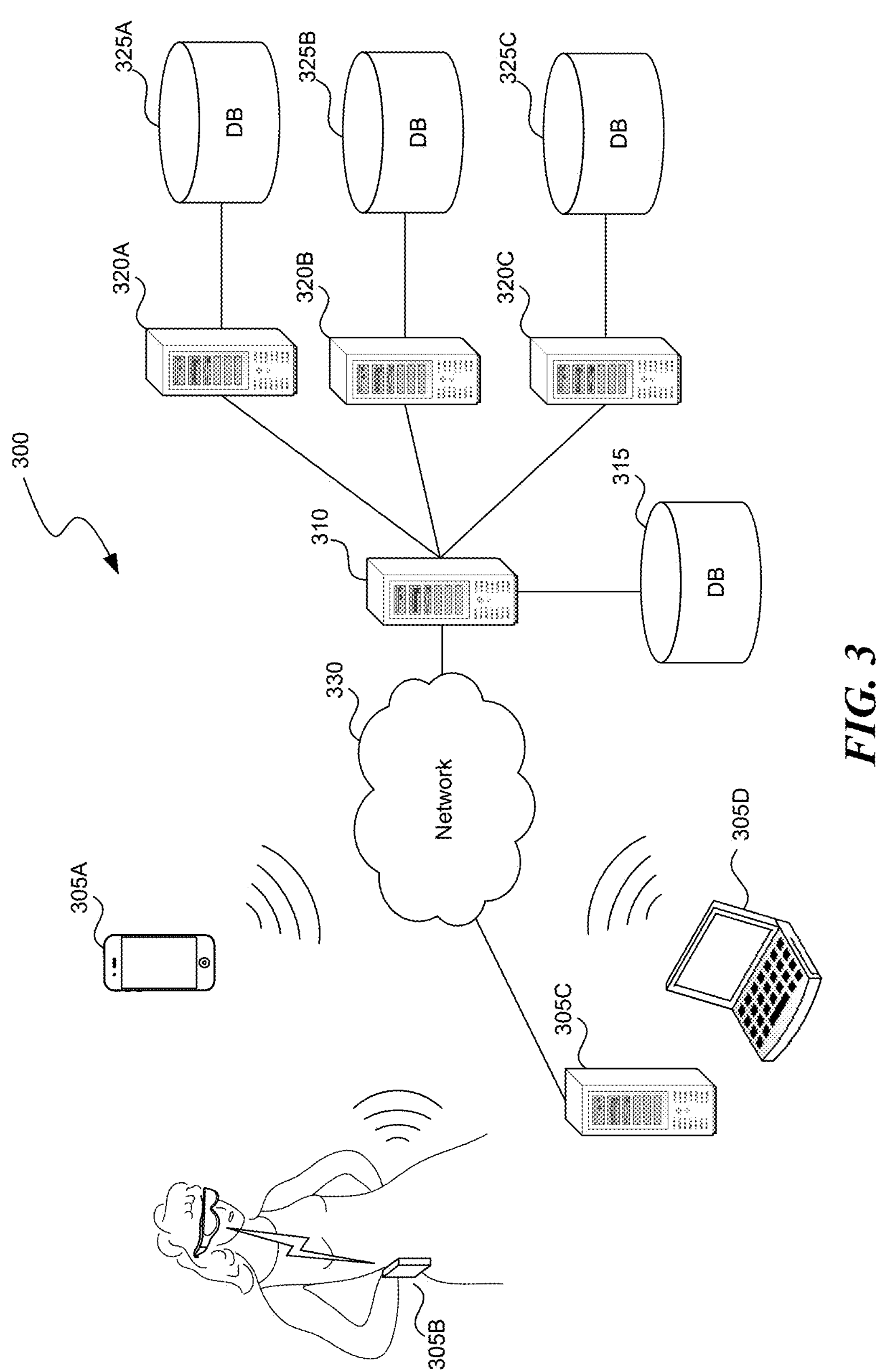
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
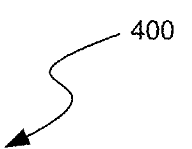
FIG. 4 is a block diagram illustrating components which, in some implementations, can be used in a system employing the disclosed technology.
Figure 4:
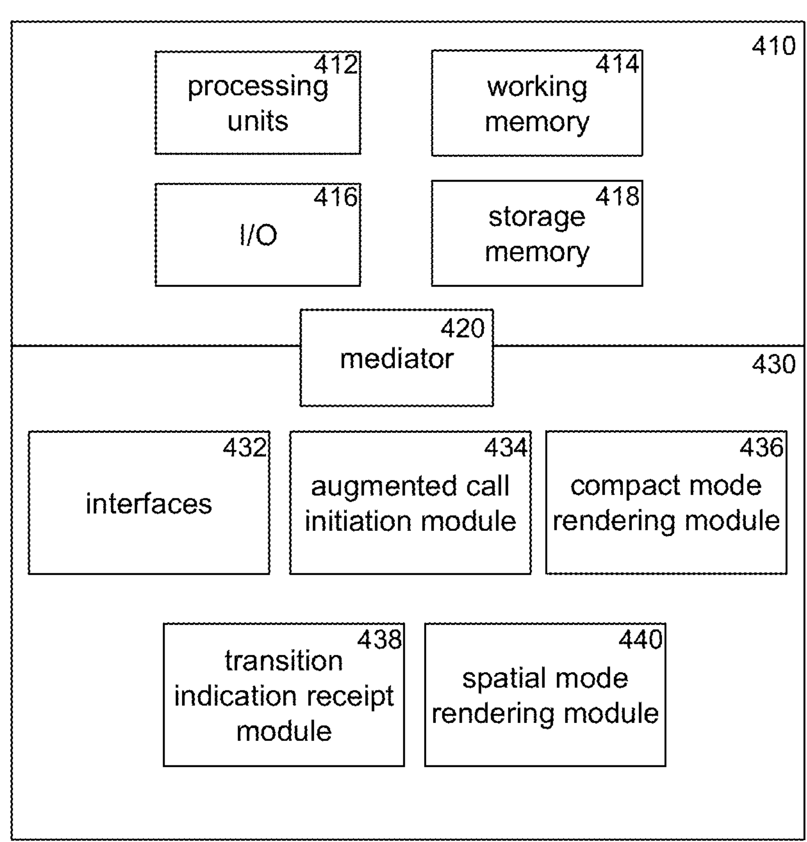

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for spawning digital human representations (DHRs) for use in an augmented calling XR environment. Specialized components 430 can include augmented call initiation module 434, compact mode rendering module 436, transition indication receipt module 438, spatial mode rendering module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications. In some implementations, specialized components 430 can be included in DHR spawning system 164. In some implementations, specialized components 430 can execute process 500 of FIG. 5.

Augmented call initiation module 434 can initiate an augmented call with a device of a call receiver. Augmented call initiation module 434 can initiate the augmented call based on, for example, a user selection of contact information associated with the call receiver (e.g., a username, a device identifier, a network identifier, a telephone number, etc.). In some implementations, the contact information can be displayed on a virtual menu rendered on an XR device of a call sender as a graphical user interface for initiating augmented calls. Augmented call initiation module 434 can then use the selected contact information to establish a connection between the XR device of the call sender and the device of the call receiver, such as over a network (e.g., network 330 of FIG. 3). The device of the call receiver can be any suitable communications device, such as a mobile phone, a laptop computer, a tablet, a smart watch, etc. In some implementations, however, the device of the call receiver can be an XR device, which, in some implementations, can also be capable of rendering an augmented call with the call sender.

In some implementations, augmented call initiation module 434 can receive a selection of a DHR type for the call sender from the call sender. In some implementations, augmented call initiation module 434 can receive a selection of a DHR type for the augmented call (i.e., both the call sender and the call receiver) from the call sender. The DHR type can be, for example, a two-dimensional (2D) image, such as a 2D avatar, a photograph, or any other image selected by and/or representative of the respective user. In another example, the DHR type can be a 3D avatar, which, in some implementations, can be dynamic, such as by being rendered with lip synching along with the corresponding augmented call audio, and/or by being rendered to match the tracked movements and/or facial expressions of the respective user. In still another example, the DHR type can be streaming video of the respective user.

In some implementations, based on augmented call initiation module 434 initiating an augmented call, augmented call initiation module 434 (or, in some implementations, a central server remote from and in operable communication with augmented call initiation module 434) can automatically select a DHR type for the call sender, call receiver, and/or for the augmented call. For example, the capabilities associated with a call sender's XR device can include available hardware, available add-ons, network latency, processing latency, processing speed, battery power, power source data, available memory, available storage, etc. In some examples, augmented call initiation module 434 (or the central server) can determine the capabilities associated with the call receiver's device. In some implementations, augmented call initiation module 434 (or the central server) can determine the capabilities of the call receiver's device based on a device identifier or device profile. For example, if the contact information used to initiate the augmented call is a telephone number, augmented call initiation module 434 (or the central server) can determine that the call receiver's device is only capable of 2D image, audio, and/or video streaming. In another example, if the contact information used to initiate the augmented call is a device identifier associated with an XR device, augmented call initiation module 434 (or the central server) can determine that the call receiver's device is capable of all DHR types for the augmented call.

In some implementations, regardless of whether the call receiver accepts the call from the call sender, augmented call initiation module 434 (or the central server) can poll the intended call receiver's device or otherwise request information about the intended call receiver's device. For example, the call receiver's device's capabilities may depend on an available communication link (e.g., available bandwidth) and additional add-ons (such as, but not limited to, one or more external cameras, one or more imaging devices integral with or in operable communication with a DHR experience system, one or more sensors, etc.). In some implementations, each device reachable on a DHR spawning system (e.g., DHR spawning system 164 of FIG. 1) may be required to provide capability information in a device-related profile for DHR augmented call initiation. In some implementations, the information can be obtained in real-time based on the capabilities associated with the call receiver's device. Similar to a call sender's device, the capabilities associated with a call receiver's device can include available hardware, available add-ons, network latency, processing latency, processing speed, battery power, power source data, available memory, available storage, etc.

In some implementations, augmented call initiation module 434 (or the central server) can determine a DHR type for the call sender, the call receiver, or both, by analyzing the respective capabilities associated with the call sender's XR device and/or the call receiver's device. The hardware, software, and device requirements to enable or utilize audio and a two-dimensional (2D) profile DHR type, an avatar DHR type, and a video DHR type can be different. For example, an avatar DHR type may require a more capable communication network in terms of bandwidth and latency than a less capable communication network capable of supporting a 2D image DHR type. Similarly, in some implementations, an avatar DHR type can require an external camera or imaging device associated with a DHR experience system and/or one or more cameras or imaging devices included in an XR device, such as an XR HMD. In contrast, a 2D video DHR type may only require a camera and microphone that resides or is otherwise available on a two-dimensional (2D) interface, such as a smartphone device or other computing device capable of capturing and rendering images in two dimensions.

In some implementations, augmented call initiation module 434 (or the central server) can analyze the capabilities associated with the call sender's device with respect to the capabilities associated with the call receiver's device to determine a compatible set of capabilities. Augmented call initiation module 434 (or the central server) can then determine if the compatible set of capabilities supports a DHR type selection made by the call sender, either for the call sender's DHR, or for both the call sender and call receiver's DHR. In some implementations, however, the DHR type for the call sender, the call receiver, or both can be automatically selected based on a compatible set of capabilities between the call sender's XR device and the call receiver's device (e.g., the capturing/streaming capabilities of the call sender's device with reference to the receiving/displaying capabilities of the call receiver's device, and vice versa). For example, augmented call initiation module 434 (or the central server) can select an avatar DHR call type if both devices support avatar DHRs (e.g., both are XR devices, both have sufficient battery power, both have sufficient network latency, etc.). In another example, augmented call initiation module 434 (or the central server) can select a video DHR for the call sender (as rendered on the call receiver's device) if the call receiver's device is a smartphone, and select an avatar DHR for the call receiver (as rendered on the call sender's XR device) based on the 3D rendering capabilities of the call sender's XR device. Further details regarding initiating an augmented call with a device of a call receiver are described herein with respect to block 502 of FIG. 5.

Compact mode rendering module 436 can, responsive to initiation of the augmented call by augmented call initiation module 434, automatically render the augmented call in a compact mode. In some implementations, the compact mode can be used in situations requiring multitasking, such that a viewer can interact with an XR environment while attending to tasks in the real-world environment. Compact mode rendering module 436 can render the DHR of the call receiver (whose DHR type can be manually selected by the call sender, manually selected by the call receiver, or automatically selected as described above) body-leashed to the call sender, i.e., locked to the body of the call sender, such that the DHR stays at a same position relative to the call sender as the call sender moves about the real-world environment. In such an AR or MR environment, the DHR of the call receiver can be overlaid onto a view of the real-world environment, thereby allowing the call sender to view and interact with the real-world environment while being in the compact mode call. Further details regarding rendering an augmented call in a compact mode are described herein with respect to block 504 of FIG. 5.

Transition indication receipt module 438 can receive an indication to transition the augmented call, from the compact mode rendered by compact mode rendering module 436, into a spatial mode. In some implementations, transition indication receipt module 438 can receive the indication as user input from the call sender, e.g., by selection of a virtual button displayed on the XR device, by selection of a physical button (e.g., on one or more controllers in operable communication with the XR device, on the XR device itself, etc.), by making a gesture captured and interpreted by the XR device, and/or by making an audible announcement captured and processed by the XR device (e.g., "enter spatial mode for the augmented call"). In some implementations, transition indication receipt module 438 can receive the indication based on a system-level or system-defined event, such as based on a timer, based on the call sender entering a particular physical space (e.g., as determined by analyzing one or more spatial anchors, one or more established boundaries for the physical space, and/or scene data or visual features for the space), based on the call sender's interactions with the XR environment (e.g., interacting or not interacting with other virtual objects), based on the call sender's movement or lack or movement, based on the call sender's interactions with the real-world environment, etc. Further details regarding receiving an indication to transition an augmented call to spatial mode are described herein with respect to block 506 of FIG. 5.

Spatial mode rendering module 440 can, responsive to transition indication receipt module 438 receiving the indication, transition the augmented call into the spatial mode. In some implementations, the spatial mode call can be entered when the call sender desires to be in a general multitasking XR environment in which he or she can interact with multiple XR experiences and the DHR of the call receiver. In some implementations, the DHR type and other configuration settings, such as an anchored location, can be inherited from the compact call mode. In the spatial mode, spatial mode rendering module 440 can render the DHR of the call receiver world-locked relative to a spatial anchor established for the real-world environment (i.e., remaining in the same location relative to the spatial anchor, instead of body-locked to the call sender). In some implementations in which the call receiver's device is also an XR device, the spatial anchor can be shared between the call sender's XR device and the call receiver's XR device, providing a shared central location in the XR environment. In some implementations, spatial mode rendering module 440 can obtain shared space entry parameters, including but not limited to a distance from the shared anchor to spawn the DHR and a shape around the shared anchor used to place the spawned DHR in the XR environment. For example, the distance from the shared anchor to the DHR can be the same for all users (e.g., multiple call receivers) when entering into the XR environment. Alternatively, or in addition, the distance can be dependent upon DHR types for the respective users. In some implementations, spatial mode rendering module 440 can determine a spawn height based on the DHR type and whether or not the user is within a field-of-view of the imaging device associated with the DHR experience system. In some implementations, spatial mode rendering module 440 can spawn the DHR at a location around the spatial anchor and a specified distance from the spatial anchor (e.g., at a predetermined vertical height), such that the call sender and the DHR of the call receiver are "eye to eye." Further details regarding transitioning an augmented call into a spatial mode are described herein with respect to block 508 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
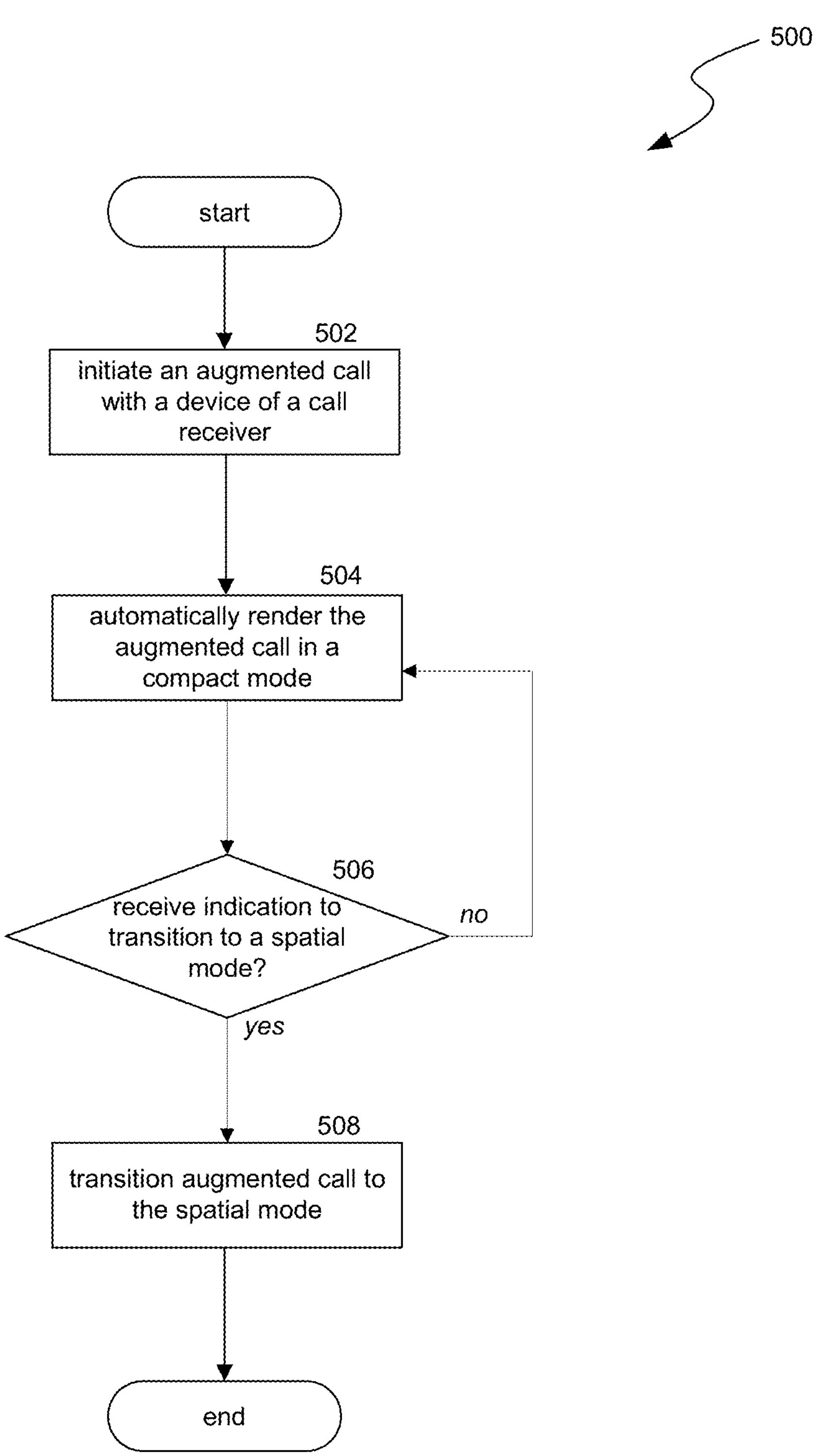
FIG. 5 is a flow diagram illustrating a process used in some implementations for spawning a digital human representation of a call receiver in an augmented call between a call sender and the call receiver.

FIG. 5 is a flow diagram illustrating process 500 used in some implementations for spawning a digital human representation (DHR) of a call receiver in an augmented call between a call sender and the call receiver. In some implementations, process 500 can be performed as a response to a call sender's request to initiate an augmented call with a call receiver's device. In some implementations, process 500 can be performed by an XR system including one or more XR devices, e.g., an XR HMD (e.g., XR HMD 200 of FIG. 2A or XR HMD 252 of FIG. 2B), one or more controllers (e.g., controllers 276A and/or 276B of FIG. 2C), one or more external processing components, a DHR experience system used to capture images of the call sender for the augmented call, etc. In some implementations, process 500 can be performed by DHR spawning system 164 of FIG. 1.

At block 502, process 500 can initiate an augmented call with a device of a call receiver. The device of the call receiver can be, for example, an XR device, a computer, a tablet, a mobile phone, a smart device, or any other device capable of audio, video, and/or augmented communication. In some implementations, process 500 can be performed upon receiving an indication or trigger from a call sender to initiate an augmented call. For example, the call sender can navigate a contact list or otherwise select a contact means, such as a telephone number, email address, device identifier, network identifier, username, or other locator of a call receiver or call receiver device. In some implementations, process 500 can suggest initiation of an augmented call with the call receiver to the call sender. For example, upon viewing a virtual or real-world photograph of the call receiver in an XR environment, process 500 can display a message, via a user interface of an XR device of the call sender, prompting the call sender to initiate an augmented call with the call receiver. Upon selection of the prompt, process 500 can then initiate the augmented call with the device of the call receiver. As another example, process 500 can initiate the augmented call with the call receiver's device as part of another system-detected or system-initiated event, such as a timed event (e.g., a calendar event, a daily event, etc.), a gesture event (e.g., a gesture toward a photograph of the call receiver), an audible announcement by the call sender indicating to call the call receiver (e.g., "Call John!"), etc.

In some implementations, initiating the augmented call can cause selection of a digital human representation (DHR) type for the call sender or call receiver. The DHR types can include a 3D avatar, a 2D image, a video stream, or any combination thereof, of the call sender and/or the call receiver, each including corresponding streaming audio. In some implementations, the DHR types can include subtypes. For example, an avatar DHR type can include a minimally stylized avatar DHR subtype or an expressive stylized avatar DHR subtype. A minimally stylized avatar DHR subtype can include an avatar that mimics a minimal set of features associated with a call sender or call receiver. For example, a minimally stylized avatar DHR subtype can perform a lip-synch mimicry of a call sender or call receiver. In examples, the minimally stylized avatar DHR subtype can be used when a user is not in front of the field-of-view of an imaging device associated with a DHR experience system. An expressive stylized avatar DHR subtype can include an avatar that mimics an extensive set of features associated with a call sender or call receiver. For example, an expressive stylized avatar DHR subtype can mimic body movements, such as but not limited to hand, arm, finger, leg, foot, and head movements, in addition to mimicking expressions and other facial gestures (such as lip-synching) of a call sender or call receiver. In examples, the expressive stylized avatar DHR subtype can be used when a user is in front of the field-of-view of an imaging device associated with a DHR experience system. Further details regarding avatar DHR subtypes are described herein with respect to FIG. 7A.

In some implementations, a video DHR call type can include a two-dimensional (2D) video DHR subtype and a two-and-a-half dimensional (2.5D) DHR call subtype. The 2D video DHR subtype can include 2D video supported by one or more imaging devices associated with a call sender's XR device or call receiver's device. The 2.5D video DHR subtype can refer to video depicting movement in a XR environment restricted to a 2D plane that otherwise appears three-dimensional. In some examples, 2.5D video can be obtained or otherwise represented as right and left video feeds that are displayed to a user's respective right and left eye. For example, a left video feed slightly different from a right video feed can be shown to a user's left eye while the right video feed is shown to a user's right eye to achieve pseudo three-dimensional video. In examples, the left and right video feeds may be obtained from slightly different perspectives or one feed may be slightly delayed from another.

The hardware, software, and device requirements to enable or utilize a 2D image DHR type, avatar DHR types, and video DHR types can be different. For example, an avatar DHR type may require a more capable communication network in terms of bandwidth and latency than a less capable communication network capable of supporting a 2D image DHR call type. Similarly, an avatar DHR call type can require a camera or external imaging device associated with a DHR experience system. In contrast, a 2D image DHR type and a 2D video DHR type representation may require a camera and microphone that resides or is otherwise available on a 2D interface, such as a smartphone device or other computing device.

In some implementations, initiating the augmented call can cause selection of a DHR call type for the augmented call (i.e., a common DHR type for both the call sender and the call receiver). In some implementations, the call sender can manually select the DHR type for the call sender and/or call receiver. In some implementations, however, selection of the DHR type for the call sender and/or the call receiver can be performed automatically. For example, in some implementations, process 500 (or a central server having networked communication capabilities with both the call sender's XR device and the call receiver's device) can detect one or more capabilities associated with the call sender's XR device. In some implementations, the capabilities of the call sender's XR device can be dependent on an available communication link (e.g., available bandwidth) between the XR device and the call receiver's device or additional add-ons (such as, but not limited to, one or more external cameras, one or more imaging devices or cameras associated with a DHR experience system, one or more sensors, etc.) that may or may not be present. The additional sensors can include but are not limited to an imaging device associated with an XR HMD, hand tracking sensors, or other sensors utilized to increase fidelity when capturing user movements. In some implementations, the capabilities of the call sender's XR device can include both its capturing and streaming capabilities for the call sender's DHR, as well as its downloading, processing, and rendering capabilities for the call receiver's DHR, which can be different. For example, the call sender's XR device may include sophisticated cameras that consume minimal processing power, thereby supporting 3D avatar streaming for the call sender, but have a display with a low refresh rate, supporting only rendering of a call receiver as a 2D image with audio.

In some implementations, process 500 (or the central server) can determine the capabilities associated with the call receiver's device. In some implementations, process 500 (or the central server) can query the call receiver's device or otherwise request data about the call receiver's device. In some implementations, the data can be obtained from a call receiver's profile or the call receiver's device information (e.g., device identifier, hardware identifier, type of identifier used to contact the call receiver, etc.). For example, the call receiver's device's capabilities may depend on an available communication link (e.g., available bandwidth) and additional add-ons (such as, but not limited to, one or more external cameras, one or more imaging devices associated with a DHR experience system, one or more sensors, etc.). In some implementations, each device reachable on the DHR spawning system (e.g., the call sender and one or more call receiver(s)) may be required to provide capability information in a device-related profile for augmented call initiation. In some implementations, the capabilities of the call receiver's device can include both its capturing and streaming capabilities for the call receiver's DHR, as well as its downloading, processing, and rendering capabilities for the call sender's DHR, which can be different.

In some implementations in which a DHR type for the call sender and/or the call receiver is suggested based on capabilities of the respective devices, the DHR type for the call sender and/or the call receiver can be automatically selected (e.g., a highest quality or most realistic available DHR type based on the capabilities of each device). In some implementations when a DHR type is suggested, however, process 500 can present available DHR types to the call sender via the call sender's XR device based on the set of capabilities of the respective devices. For example, process 500 can present a 2D image DHR type, a video DHR type, and/or an avatar DHR type to the call sender, which the call sender can select for the call sender's DHR and/or the call receiver's DHR. For example, process 500 can cause an avatar DHR call type of the call receiver to be displayed to the call sender when both the call sender and call receiver are using XR HMDs; however, the avatar DHR type of the call sender may not be displayed to the call sender as an option for the call receiver's DHR (displayed on the call sender's device) when the call receiver is using a smartphone. As another example, process 500 can cause a 2D image DHR call type (i.e., for both the call sender and the call receiver) to be displayed to a call sender if a communication network does not support higher bandwidth DHR call types, such as video and avatar DHR call types.

In some implementations, the call sender can select one or more of the presented DHR types for the DHRs of the call sender and/or the call receiver, and process 500 can receive the DHR type selection(s). In some implementations in which the call sender makes a manual selection of DHR types for the call sender and/or call receiver, process 500 can prompt the call sender to select one or more different DHR types based on the capabilities of the call sender's XR device and/or the call receiver's device. In some implementations, the call receiver's device can prompt the call receiver to select his or her own DHR type upon initiation of the augmented call which, in some examples, can be based on the capabilities of the call receiver's device and/or the call sender's XR device.

In some examples, process 500 can display a preview of the DHR of the call receiver. For example, if the DHR subtype for the call receiver is an expressive stylized avatar, a camera integral with or in operable communication with a DHR experience system can acquire images of the call receiver such that the DHR spawning system (e.g., DHR spawning system 164 of FIG. 1) can render an expressive stylized avatar in a preview window of the call sender's XR device. Similarly, a preview window at the call receiver's device can display the DHR of the call sender. For example, if the DHR subtype is 2D video, a camera associated with the XR device of the call sender can acquire 2D video, and the call receiver's device can display the 2D video in a preview window. In some implementations, the call receiver's device can display the DHR type and/or the DHR subtype for the augmented call and/or for the call receiver to the call receiver such that the call receiver is informed as to how the call receiver will be captured by the call receiver's device, and rendered on the call sender's device. An exemplary preview of a DHR is shown and described herein with respect to FIG. 10.

At block 504, responsive to initiation of the augmented call at block 502, process 500 can automatically render the augmented call in a compact mode. In the compact mode, process 500 can render the DHR of the call receiver in the DHR type selected for or by the call receiver. In some implementations, process 500 can initially render the call receiver's DHR as body-leashed to the call sender. For example, the call receiver's DHR can be rendered in the same position and orientation with respect to the call sender, and move with the call sender as the call sender traverses his or her real-world environment. In some implementations, process 500 can render the call receiver's DHR as billboarded to the call sender (i.e., always facing the call sender, regardless of movements of the call receiver in his or her real-world environment) and/or with rotation disabled relative to the call sender. In some implementations, based on user input, process 500 can switch the DHR of the call receiver to be world-locked instead of body-leashed while in compact mode. While world-locked, the DHR of the call receiver can be fixed in the call sender's real-world environment, e.g., relative to a spatial anchor established for the real-world environment, relative to a DHR experience system used to capture images of the call sender for the augmented call, etc. In some implementations, the DHR of the call sender can be similarly rendered on the device of the call receiver in compact mode when the call receiver is using an XR device. Further details regarding DHR types, subtypes, and spawned DHRs associated with the call sender and the call receiver are discussed herein with respect to FIGS. 6-10.

At block 506, process 500 can determine whether an indication has been received to transition the augmented call from the compact mode to a spatial mode. In some implementations, the indication can be explicit user input, e.g., selection of a physical or virtual button associated with switching the augmented call to spatial mode, an audible request to enter spatial mode (e.g., "Maximize my augmented call!"), a detected gesture associated with switching the augmented call to spatial mode (e.g., a pinch and throw gesture relative to the call receiver's DHR), etc. In some implementations, the indication can be implicit or system-generated, e.g., based on a timer, based on a calendar, based on a detected event (e.g., the call sender sits down or becomes inactive, the call sender enters a particular room, etc.), and/or the like.

If, at block 506, process 500 determines that an indication has not been received to transition to the spatial mode, process 500 can return to block 504, and continue rendering the augmented call in the compact mode. If, however, at block 506, process 500 determines that an indication has been received to transition to the spatial mode, process 500 can proceed to block 508. At block 508, process 500 can, responsive to receiving the indication, transition the augmented call into the spatial mode. While in the spatial mode, process 500 can render the DHR of the call receiver world-locked relative to a spatial anchor established for the real-world environment. In other words, the DHR of the call receiver can remain fixed to a frame of reference for the real-world environment, and can no longer be body-leashed to the call sender.

In some implementations, process 500 can render the call receiver's DHR as scaled larger in the spatial mode than in the compact mode. For example, process 500 can render the call receiver's DHR as being "life size," or similar in size to the call sender. In some implementations, process 500 can render the call receiver's DHR at a fixed vertical distance between the spatial anchor and the XR device of the call sender, such that the call sender and the call receiver appear to be "eye to eye." In some implementations, the call sender's XR device and the call receiver's device can both enter the spatial mode simultaneously when the call receiver's device is an XR device. However, in some implementations, it is contemplated that the call sender's XR device and the call receiver's XR device can enter spatial mode separately, and/or that the call receiver's XR device need not enter spatial mode throughout the augmented call, regardless of the call mode on the call sender's XR device.

In some implementations, process 500 can inherit the DHR type for the call receiver from the compact mode into the spatial mode (i.e., the DHR type for the call receiver can remain the same through the transition and/or throughout the augmented call). In some implementations, however, it is contemplated that either or both of the call sender or call receiver can select a new DHR type for themselves while in the augmented call, and/or can change the DHR type for the augmented call (i.e., for both the call sender and the call receiver). In some implementations, it is contemplated that process 500 can automatically change the DHR type for the call sender and/or the call receiver during the augmented call based on one or more changes in the capabilities of the call sender's XR device or the call receiver's device. For example, if the call sender's XR device is running low on power, process 500 can automatically change the call receiver's DHR from an avatar to a 2D image.

In some implementations, in the spatial mode, process 500 can render the DHR of the call receiver at a location on a circumference of a spawning circle having a center at the spatial anchor established for the real-world environment, with the call sender also being located on the circumference of the spawning circle. Thus, an orientation of the DHR of the call receiver toward the call sender can be determined in accordance with the location of the call receiver's DHR relative to the location of the call sender. In some implementations, one or more virtual objects can also be rendered on the circumference of the spawning circle, the size of which can change the radius of the spawning circle. In some implementations, the spatial anchor at the center of the spawning circle can be shared between the XR device of the call sender and the XR device of the call receiver, such that the call sender and call receiver see each other (and any virtual objects) in the same positions and orientations, and can interact accordingly, providing a realistic and lifelike user experience. Although described herein and throughout as referencing a single call receiver and call receiver's device, it is contemplated that the processes described herein can be similarly applied to a group augmented call, e.g., having multiple call receivers with respective call receiver devices.

Figure 6:
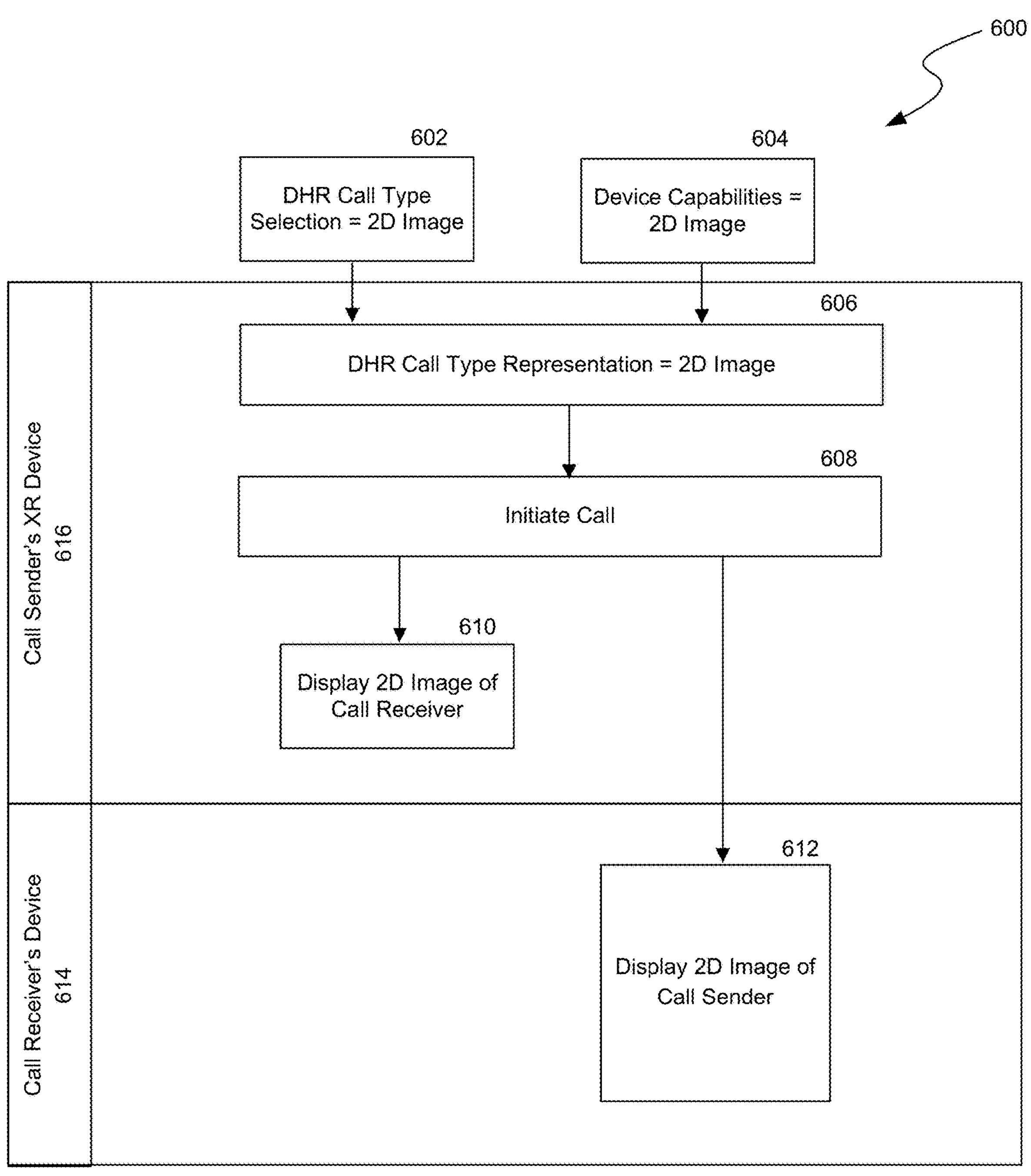
FIG. 6 is a flow diagram illustrating a process used in some implementations for displaying a two-dimensional image digital human representation of a call sender to a call receiver and for displaying a two-dimensional image digital human representation of a call receiver to a call sender.

FIG. 6 is a flow diagram illustrating process 600 used in some implementations for displaying a 2D image DHR of a call sender to a call receiver and for displaying a 2D image DHR of a call receiver to a call sender, when a single DHR type is used for the augmented call (i.e., for both the call sender and call receiver). In some examples, process 600 can be performed and/or facilitated by DHR spawning system 164 of FIG. 1. In some examples, a process specific to each communication device can perform a portion of the process 600 (e.g., call receiver's device 614 and/or call sender's XR device 616).

At block 602, process 600 can receive a DHR call type selection of a 2D image call type, such as was manually selected by the call sender. At block 604, process 600 can determine that both call receiver's device 614 and call sender's XR device 616 have capabilities to execute a 2D image call. Based on block 602 and block 604, at block 606, process 600 can determine that the DHR call type is the 2D image type. Thus, at block 608, process 600 can initiate a call between call sender's XR device 616 and call receiver's device 614 based on the DHR call type determined at block 606. That is, process 600 can initiate a call at block 608, where the call sender is represented by a 2D image on call receiver's device 614, and the call receiver is represented by an XR 2D image on call sender's XR device 616. At block 610, call sender's XR device 616 can display a 2D image of the call receiver (e.g., a photograph) or another still image selected by and/or representative of the call receiver. Similarly, at block 612, call receiver's device 614 can display the call sender's 2D image or another still image selected by or representative of the call sender.

Although FIG. 6 depicts that the DHR types are the same for the call sender and the call receiver, in other implementations described herein, the call sender can use a DHR type that is different than the DHR type used by the call receiver. For example, the call sender can use an avatar as the DHR type while the call receiver can use a 2D image as the DHR type, as described further herein with reference to FIGS. 7A-7B. In some implementations, the different DHR types can be selected based on the capabilities of call receiver's device 614 and/or call sender's XR device 616, which can include their capturing capabilities, their streaming capabilities, their downloading capabilities, their processing capabilities, their rendering capabilities, etc., relative to available hardware, available processing power, available bandwidth, latency, battery power, etc.

Figure 7A:
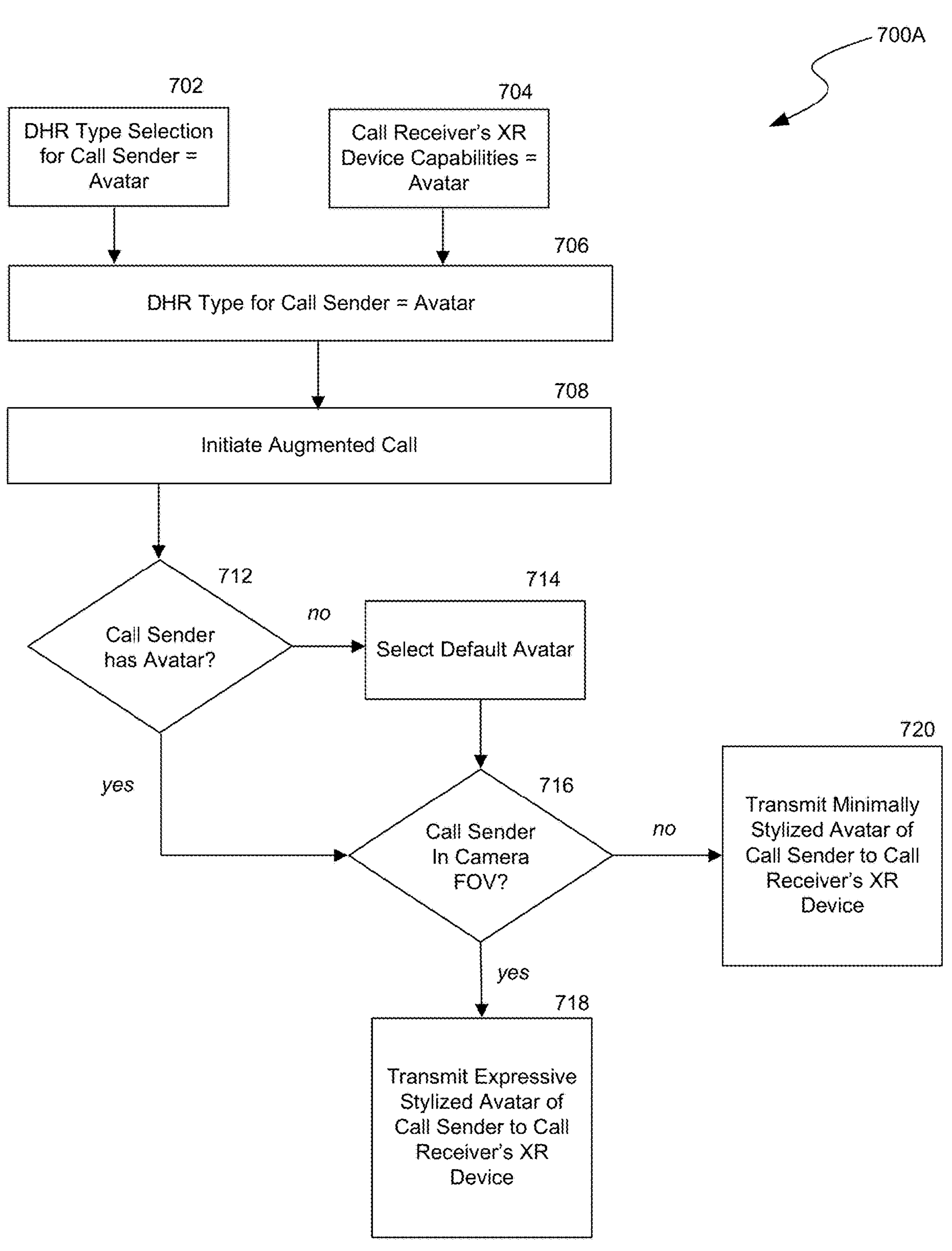
FIG. 7A is a flow diagram illustrating a process used in some implementations for transmitting an avatar digital human representation of a call sender to a call receiver's device.

FIG. 7A is a flow diagram illustrating a process used in some implementations for transmitting an avatar DHR of a call sender to a call receiver's device. In some implementations, process 700A can be performed by a call sender's XR device. In some implementations, process 700A can be performed as a response to a call sender's XR device request to initiate an augmented call with the call receiver's XR device.

At block 702, process 700A can receive a selection, by the call sender, of an avatar DHR type for the call sender, as will be rendered on the call receiver's XR device. At block 704, process 700A can obtain data indicating that the call receiver's XR device capabilities support avatar DHR augmented calling. Based on the information in block 702 and block 704, at block 706, process 700A can determine that the DHR type for the call sender is an avatar type. Thus, at block 708, process 700A can initiate an augmented call between the call sender's XR device and the call receiver's XR device based on the DHR type determined in block 706. That is, process 700A can initiate an augmented call at block 708, where the call sender uses an avatar as the DHR on the call receiver's XR device.

Upon initiation of the augmented call at block 708, process 700A can determine, at block 712, whether the call sender has an avatar available. If it is determined that the call sender does not have an avatar available at block 712, process 700A can proceed to block 714, and a default avatar can be selected for the call sender. The default avatar can be, for example, a generic avatar, or can be personalized based on known demographics data for the call sender. Process 700A can then proceed to block 716. If it is determined that the call sender has an avatar available at block 712, process 700A can also proceed to block 716.

At block 716, process 700A can determine whether the call sender is within a field-of-view of a camera integral with or in operable communication with the XR device (e.g., an external imaging device in a DHR experience system used to capture images of the call sender). As described herein, process 700A can determine whether the call sender is within a field-of-view of the camera by, for example, applying object detection and/or object recognition techniques to images captured by the camera. If it is determined that the call sender is not within the field-of-view of the camera, process 700A can proceed to block 720, and process 700A can transmit a minimally stylized avatar of the call sender to the call receiver's XR device to be rendered in the augmented call. If it is determined that the call sender is within the field-of-view of the camera, process 700A can proceed to block 718, and process 700A can transmit an expressive stylized avatar of the call sender to the call receiver's XR device to be rendered by process 700B of FIG. 7B (not shown). Minimally and expressive stylized avatars (and other DHR subtypes) are described further herein with respect to FIG. 5.

Figure 7B:
FIG. 7B is a flow diagram illustrating a process used in some implementations for transmitting a two-dimensional image digital human representation of a call receiver to a call sender's device.
Figure 7B:
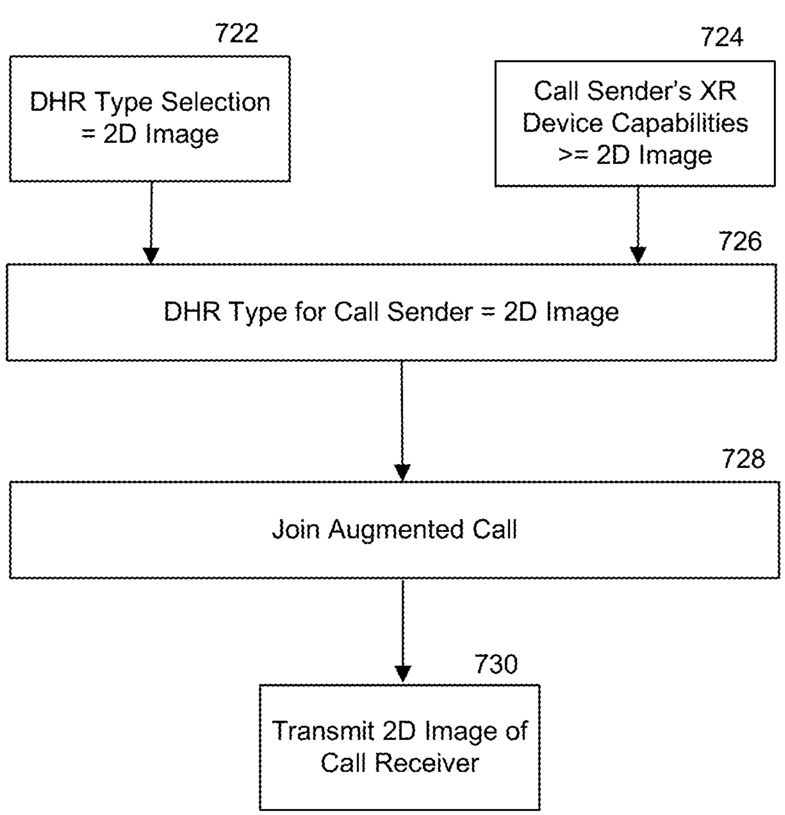

FIG. 7B is a flow diagram illustrating a process used in some implementations for transmitting a two-dimensional image digital human representation of a call receiver to a call sender's device. In some implementations, process 700B can be performed by a call receiver's XR device. In some implementations, process 700B can be performed as a response to a call sender's XR device request to initiate an augmented call with the call receiver's XR device, such as at block 708 of FIG. 7A.

Upon initiation of the augmented call at block 708 of FIG. 7A, process 700B can receive a selection by the call receiver of a 2D image DHR type for the call receiver, as rendered on the call sender's XR device at block 722. At block 724, process 700B can obtain data indicating that the call sender's XR device is capable of supporting a 2D image augmented call. Thus, at block 726, process 700B can set the DHR type for the call receiver as a 2D image. At block 728, process 700B can join the augmented call initiated at block 708 of FIG. 7A. At block 730, process 700B can transmit the 2D image of the call receiver, which can be rendered by process 700A of FIG. 7A (not shown).

Although shown and described in FIGS. 7A-7B as receiving a DHR type selection from the call sender and the call receiver, respectively, it is contemplated that, in some implementations, processes 700A-700B (or a central server in operable communication with the call sender's XR device and the call receiver's XR device) can automatically select a DHR type for the call sender and/or the call receiver, which can be the same or different based on the different XR devices' capabilities. Further, although shown in process 700A as only taking into consideration the call receiver's DHR type selection at block 702 and the call receiver's XR device capabilities at block 704 (e.g., capabilities to download, process, and render an avatar DHR type), it is contemplated that process 700A can, in some implementations, further consider the call sender's XR device's capabilities to capture and transmit an avatar DHR type. Similarly, although shown in process 700B as only taking into account the call receiver's DHR type selection at block 722 and the call sender's XR device capabilities at block 724 (e.g., capabilities to download, process, and render a 2D image DHR type), it is contemplated that process 700B can, in some implementations, further consider the call receiver's XR device's capabilities to transmit a 2D image DHR type.

Figure 8:
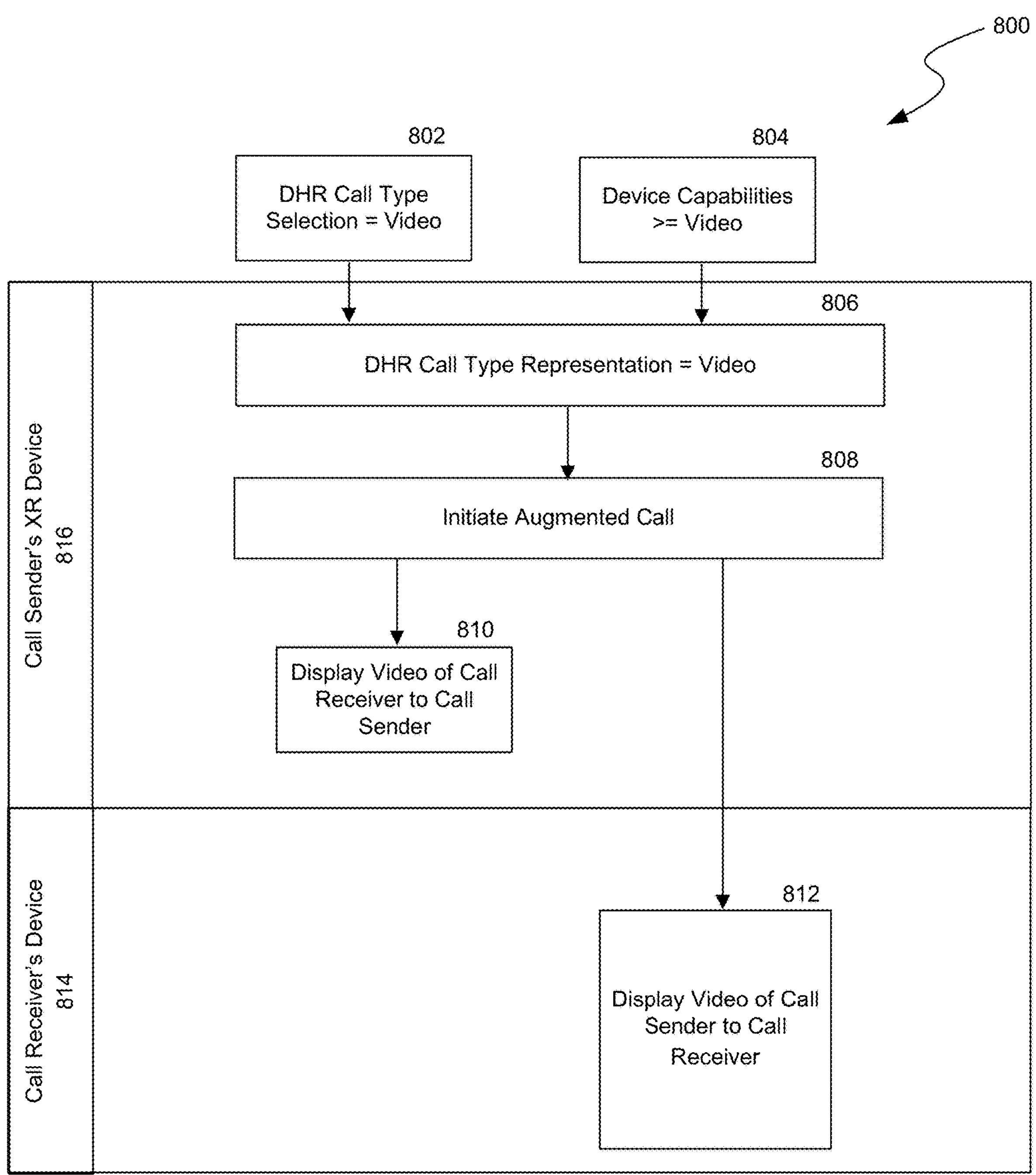
FIG. 8 is a flow diagram illustrating processes used in some implementations for displaying a video digital human representation of a call sender to a call receiver and for displaying a video digital human representation of a call receiver to a call sender.

FIG. 8 is a flow diagram illustrating process 800 used in some implementations for displaying a video DHR of a call sender to a call receiver and for displaying a video DHR of a call receiver to a call sender when a single DHR type is used for the augmented call (i.e., for both the call sender and call receiver). In some examples, process 800 can be performed and/or facilitated by DHR spawning system 164 of FIG. 1. In some examples, a process specific to each communication device can perform a portion of the process 800 (e.g., call receiver's device 814 and/or call sender's XR device 816).

At block 802, process 800 can receive a DHR call type selection of a video call type, such as was manually selected by the call sender. At block 804, process 800 can determine that both call receiver's device 814 and call sender's XR device 816 have capabilities to execute a video call. Based on block 802 and block 804, at block 806, process 800 can determine that the DHR call type is the video type. Thus, at block 808, call sender's XR device 816 can initiate an augmented call between call sender's XR device 816 and call receiver's device 814 based on the DHR call type determined at block 806. That is, call sender's XR device 816 can initiate a call at block 808, where the call sender is represented by a streaming video on call receiver's device 814, and the call receiver is represented by a streaming video on call sender's XR device 816. At block 810, call sender's XR device 816 can display a streaming video of the call receiver captured by call receiver's device 814. Similarly, at block 812, call receiver's device 814 can display the call sender's streaming video captured by call sender's XR device 816.

Although FIG. 8 depicts that the DHR types are the same for the call sender and the call receiver, in other implementations described herein, the call sender can use a DHR type that is different than the DHR type used by the call receiver. For example, the call sender can use an avatar as the DHR type while the call receiver can use a video as the DHR type. In some implementations, the different DHR types can be selected based on the capabilities of call receiver's device 814 and/or call sender's XR device 816, which can include their capturing capabilities, their streaming capabilities, their downloading capabilities, their processing capabilities, their rendering capabilities, etc., relative to available hardware, available processing power, available bandwidth, latency, battery power, etc.

Figure 9:
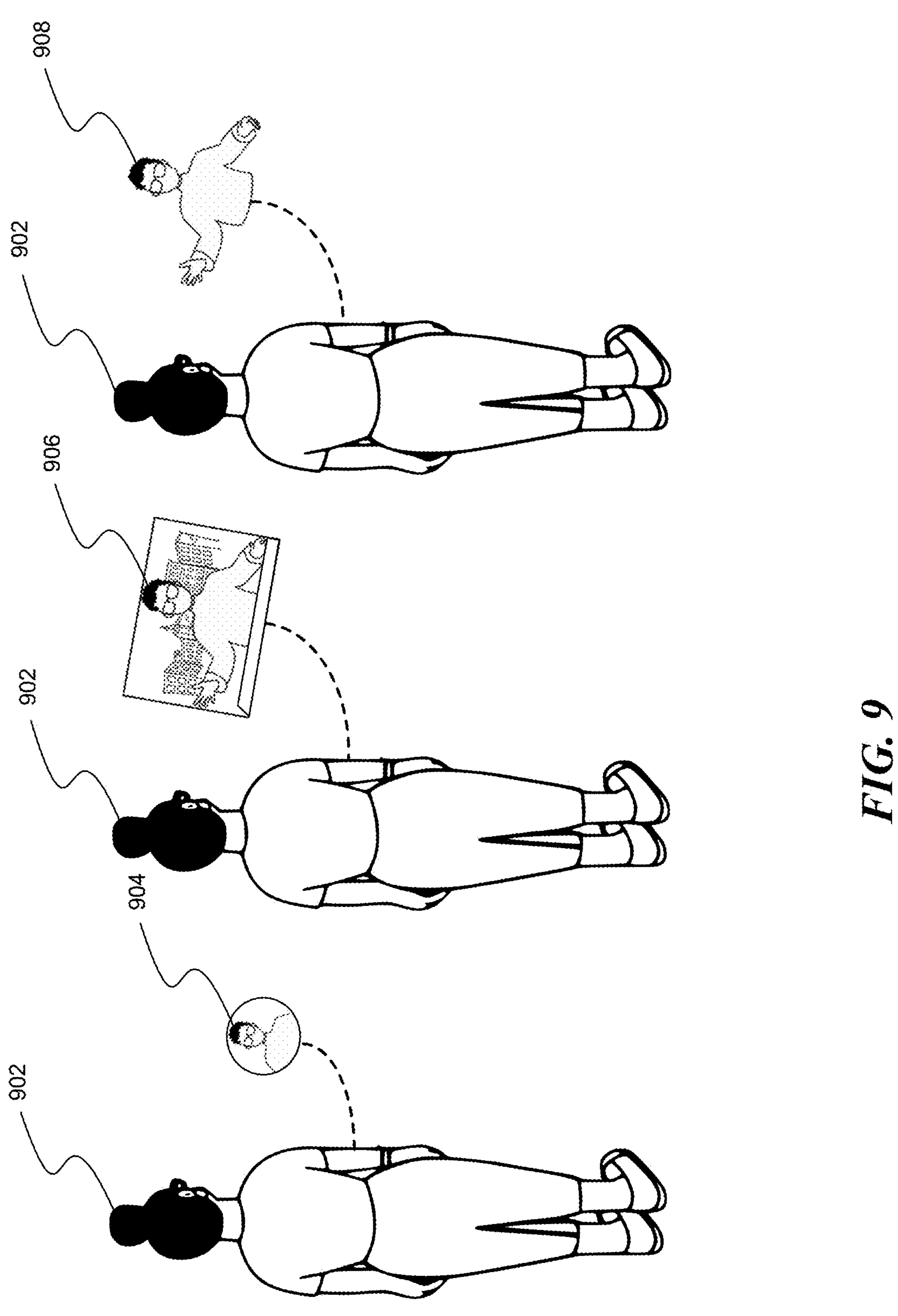
FIG. 9 is a conceptual diagram illustrating examples of spawned digital human representations in a compact mode call.

FIG. 9 is a conceptual diagram illustrating examples of spawned DHRs in a compact mode call. For example, user 902 represents the call sender or the call receiver, whereas the spawned DHRs 904, 906, and 908 represent the other of the call receiver or the call sender. In some implementations, the DHR can be generated or spawned in accordance with a set of default spawning parameters. The set of default spawning parameters can include, but are not limited to, a type of initial DHR anchoring, the position of the DHR upon initial spawning, rotation information (e.g., how the DHR is viewed from the viewer's perspective, whether the DHR can rotate around one or more axes, etc.), and/or scale information indicating an initial size of the DHR. The set of default spawning parameters can include a body-leashed type of anchoring, where the DHR is positioned at a predetermined distance and height from the viewer, presented in a billboarded fashion with the roll/z-axis rotation disabled, and scaled to a miniature or standard size. As depicted in FIG. 9, the example 2D image DHR 904 is spawned in accordance with a body-leashed type of anchoring, where the body-leashed type of anchoring can be useful when a user 902 is moving around in a real-world environment and would like to have the DHR of the other caller present in the view.

As further depicted in FIG. 9, the example video DHR 906 and the example avatar DHR 908 are spawned in accordance with the body-leashed type of anchoring. While the set of default spawning parameters may include a body-leashed type of anchoring, other types of anchoring types can include, but are not limited to, the DHR being world locked and/or stage anchored. That is, a world-locked DHR can be useful when a viewer is focused on a task, and a user needs to be outside of the field-of-view of a camera associated with the DHR experience system. For example, when a user is cooking at a stove, the DHR can be placed on the kitchen counter but aligned with the DHR experience system. In some implementations, the DHR can be stage locked, whereas a stage locked DHR can be useful when a viewer is holding the DHR experience system and the viewer is mobile. Thus, the viewer can walk around their home with the DHR anchored to a location above the DHR experience system, where a DHR representative of the viewer can be obtained by the DHR experience system and sent to another party.

Figure 10:
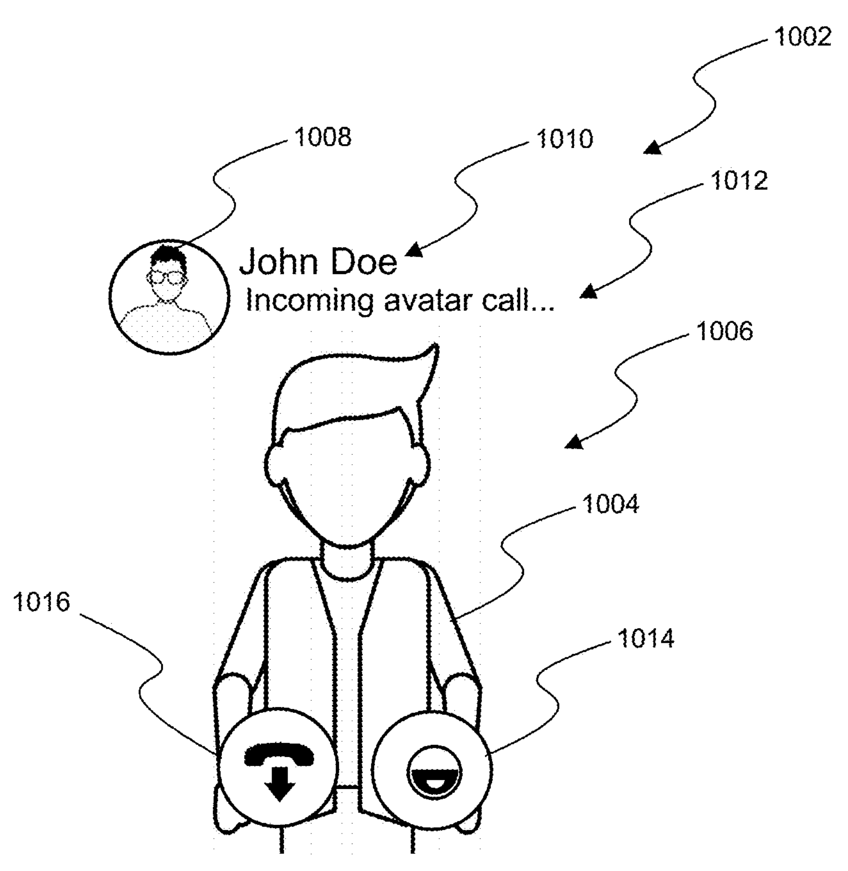
FIG. 10 is a conceptual diagram illustrating an example of an incoming augmented call indication received at a call receiver's device in accordance with some implementations.

FIG. 10 is a conceptual diagram illustrating an example of an incoming call indication 1002 received at a call receiver's device in accordance with some implementations. As depicted in FIG. 10, the incoming call indication 1002 can include a DHR representation 1004 of the call receiver depicted in a preview window 1006. The preview window 1006 can include a 2D image, video, or an avatar DHR. The call indication 1002 can also include a 2D image 1008 of the call sender, identification information 1010 of the call sender, and a DHR call type 1012. In some implementations, a call receiver can accept a call utilizing a configurable interface button 1014, where the configurable interface button 1014 can change based on the DHR call type. For example, the configurable interface button 1014 can indicate a video call when the incoming DHR call type is video. A call receiver can dismiss or send the incoming call to voicemail using the interface button 1016.

In some implementations, a call receiver can accept an incoming call utilizing a DHR type that is different than that of the call sender. For example, a call receiver can accept a call from a call sender using an avatar, but can opt to be rendered on the call sender's device as a 2D video. The call receiver can accept the call utilizing a different DHR type than the call sender by entering a call receiving menu that is accessible, for example, by using a long press on the configurable interface button 1014.

Figure 11:
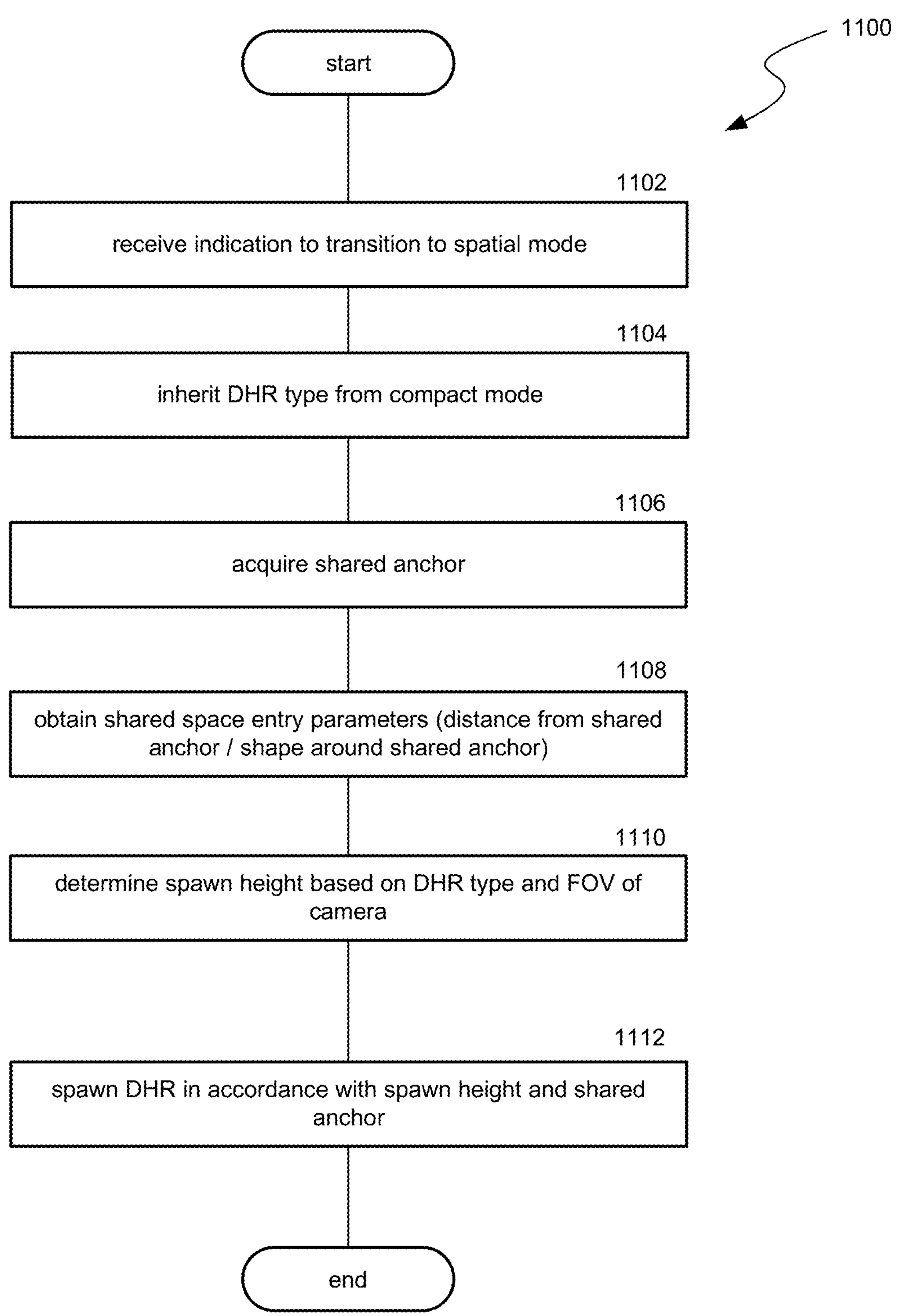
FIG. 11 is a flow diagram illustrating a process used in some implementations for transitioning from a compact mode call to a spatial mode call.

FIG. 11 is a flow diagram illustrating process 1100 used in some implementations for transitioning from a compact mode call to a spatial mode call. In some examples, process 1100 can be performed and/or facilitated by the DHR spawning system 164 of FIG. 1. A compact mode call can be used in situations requiring multitasking, such that a viewer can interact with an XR environment while attending to tasks in the real-world. A spatial mode call can be entered when a user desires to be in a fully immersive XR environment. In a spatial mode call, avatar DHRs and video DHRs can be rendered at a scale that is more life-sized in nature. Spatial mode calling can provide more natural face-to-face interaction between callers, can cause DHRs to appear consistently in known locations of a shared space or environment, and can respect reality and the way users behave in reality (e.g., body size, height, pose, movement, etc.). In some implementations, process 1100 can be performed upon a user's indication or trigger to transition to a spatial mode call and spawn a DHR in a spatial mode call. For example, at block 1102, a user can select a trigger button to initiate the transitioning process. Upon selecting the trigger, process 1100 can initiate the transitioning process and spawn a DHR of the user in a shared XR environment.

At block 1104, process 1100 can obtain the DHR type from the current compact mode call. In some implementations, the DHR type and other configuration settings, such as an anchored location, can be inherited from the compact call mode. At block 1106, process 1100 can obtain a shared anchor in the XR environment, where the shared anchor provides a shared central location in the XR environment. While the shared anchor is the same for DHRs in the XR environment, the location of the shared anchor can be specific to each user. For example, the shared anchor can be located at a center point of the DHR experience system.

At block 1108, process 1100 can obtain shared space entry parameters, including but not limited to a distance from the shared anchor to spawn the DHR and a shape around the shared anchor used to place the spawned DHR in the XR environment. For example, the distance from the shared anchor to the DHR can be the same for all users when entering into the XR environment. Alternatively, or in addition, the distance can be dependent upon a DHR type or the user. As another example, the shared space entry parameters can include the spawning shape around the shared anchor used to place the spawned DHR within the XR environment. In examples, the spawning shape can be a circle, square, or can be dependent upon the number of (e.g., amount of) DHRs sharing an XR environment, corresponding to multiple call receivers.

At block 1110, process 1100 can determine a spawn height based on the DHR type and whether or not the user is within a field-of-view of the imaging device associated with the DHR experience system. For example, a spawn height can be based on a vertical distance between the DHR (as determined by the center of the HMD or otherwise) and the shared anchor. In some implementations, the vertical distance can be the same for each DHR such that DHRs can be spawned in a face-to-face or eye-to-eye manner. In some implementations, for example, when the DHR is video, the spawn height can be based on the location (e.g., height) of the DHR experience system. When the user is not within the field-of-view of the imaging device associated with the DHR experience system, the vertical distance can be based on a different vertical distance. At block 1112, process 1100 can spawn the DHR at a location around the shared anchor shape and a specified distance from the shared anchor, where the height of the DHR is equal to the height determined in block 1110.

Figure 12:
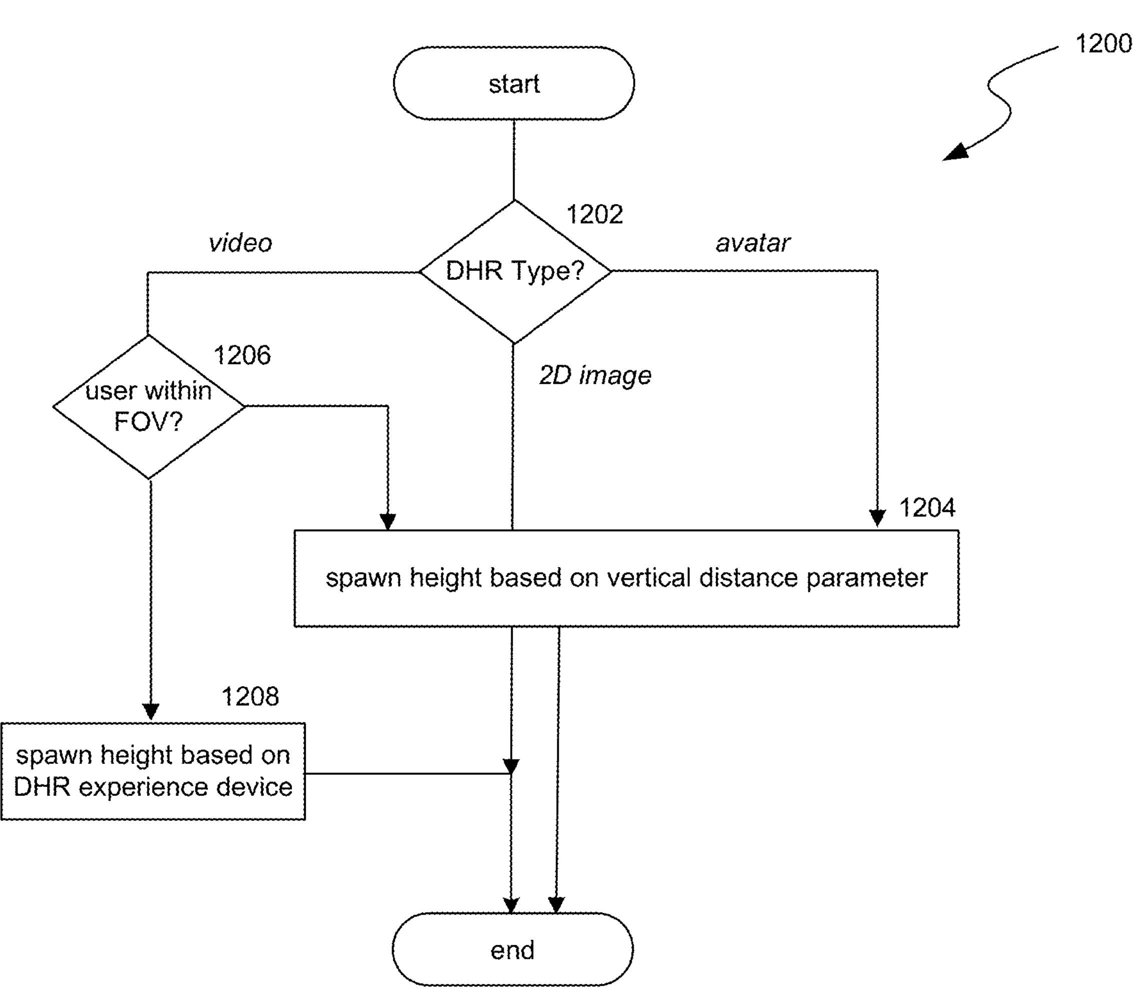
FIG. 12 is a flow diagram illustrating processes used in some implementations for obtaining call entry parameters when transitioning from a compact mode call to a spatial mode call.

FIG. 12 is a flow diagram illustrating a process 1200 used in some implementations for obtaining call entry parameters when transitioning from a compact mode call to a spatial mode call. In some implementations, the flow diagram of FIG. 12 provides additional detail of block 1110 of FIG. 11. That is, process 1200 can be initiated upon receiving a DHR type, for example, from block 1104 of FIG. 11. If, at block 1202, the DHR type is an avatar type, process 1200 can proceed to block 1204, where the spawn height can be based on the vertical distance parameter, the vertical distance parameter being equal to a constant, where the vertical distance parameter can be the distance between the center of the DHR as determined by the XR HMD worn by the user and the shared anchor. If, at block 1202, the DHR type is a 2D image type, process 1200 can proceed to block 1204, where the spawn height can be based on the vertical distance parameter, the vertical distance parameter being equal to a constant, where the vertical distance parameter is the distance between the center of the DHR as determined by the center of the 2D image and the shared anchor.

If, at block 1202, the DHR type is a video type, process 1200 can proceed to block 1206 to determine if the user is within the field-of-view of the imaging device associated with the DHR experience system. For example, one or more object recognition and/or detection techniques can be performed to determine if the user is within the field-of-view of the imaging device. In examples, Haar Cascade Classifier, deep learning model, background subtraction, optical flow, and/or edge detection techniques to determine if the user is within a field-of-view of the imaging device. If the user is within the field-of-view of the imaging device associated with the DHR experience system, then the spawn height can be based on the vertical distance parameter, the vertical distance parameter being equal to a constant, where the vertical distance parameter can be the distance between the center of the DHR as determined by the XR HMD worn by the user and the shared anchor. In examples where the user is not within the field-of-view of the imaging device associated with the DHR experience system, process 1200 can proceed to block 1208, where the spawn height of the video can be based on the vertical distance parameter, the vertical distance parameter being equal to a constant, where the vertical distance parameter can be the distance between a center location of the video and the height of the DHR experience system.

Figure 13:
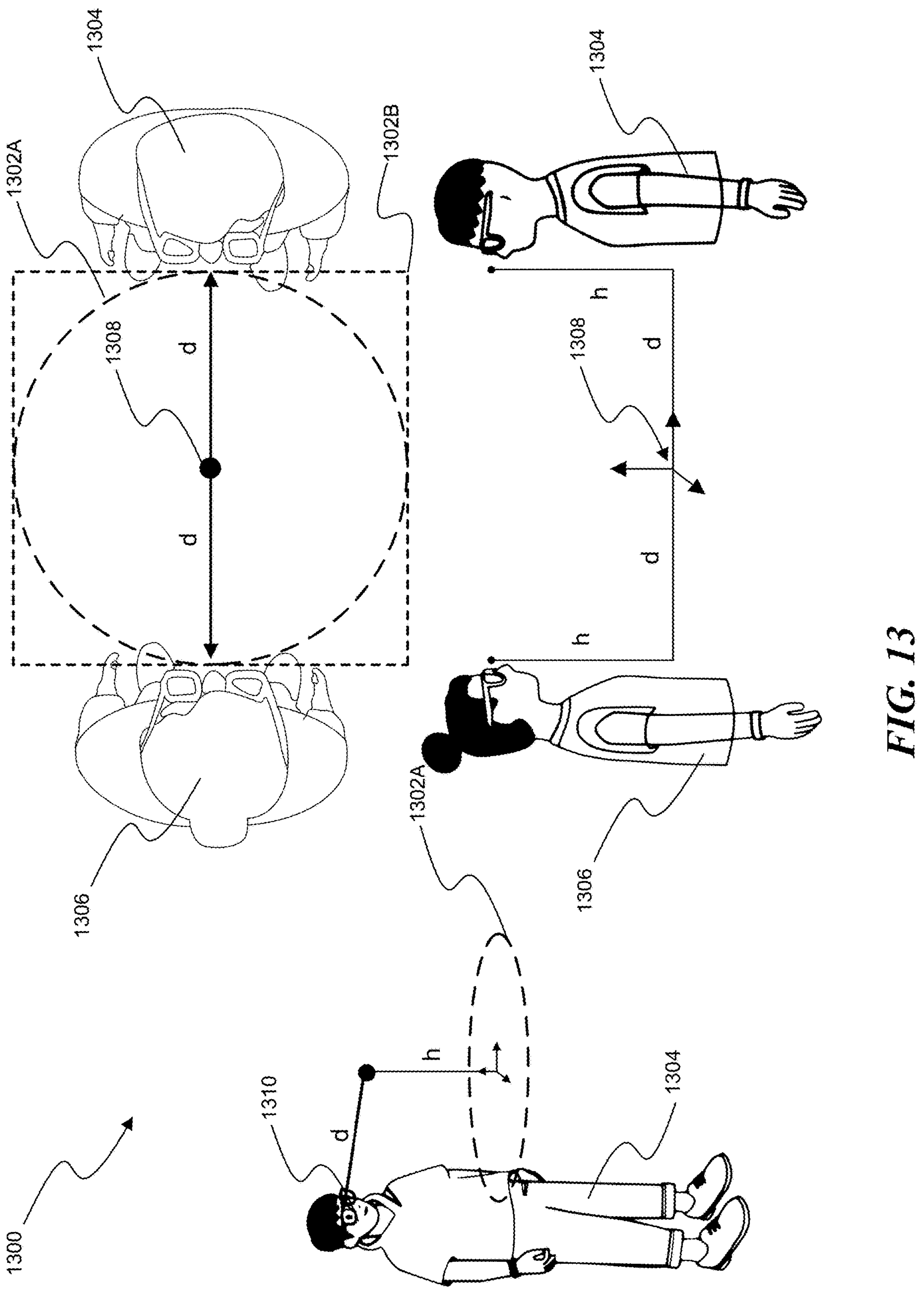
FIG. 13 is a conceptual diagram illustrating various aspects associated with spawning an avatar digital human representation in a spatial mode call.

FIG. 13 is a conceptual diagram 1300 illustrating various aspects associated with spawning an avatar DHR in a spatial mode call. A non-limiting example of a spawning shape could be a circle 1302A or a square 1302B. In examples, DHRs 1304 and 1306 are spawned around the spawning circle 1302A and/or square 1302B. As further depicted in FIG. 13, the center of the spawning circle 1302A and/or square 1302B 1302 is the shared anchor 1308, where the DHRs 1304 and 1306 are spawned at equal distances "d" from the shared anchor 1308. As further depicted in FIG. 13, the spawning circle 1302A and/or square 1302B is positioned at a height that can be based on the height of the user having DHR 1304. For example, a vertical distance "h" can be equal to a constant. The spawning circle 1302A and/or square 1302B is placed such that the center of the DHR associated with the user having DHR 1304 is based on the center of the XR HMD 1310 worn by the user having DHR 1304 and the vertical distance "h". Accordingly, the DHRS 1304 and 1306 can be placed in a face-to-face or eye-to-eye configuration.

Figure 14:
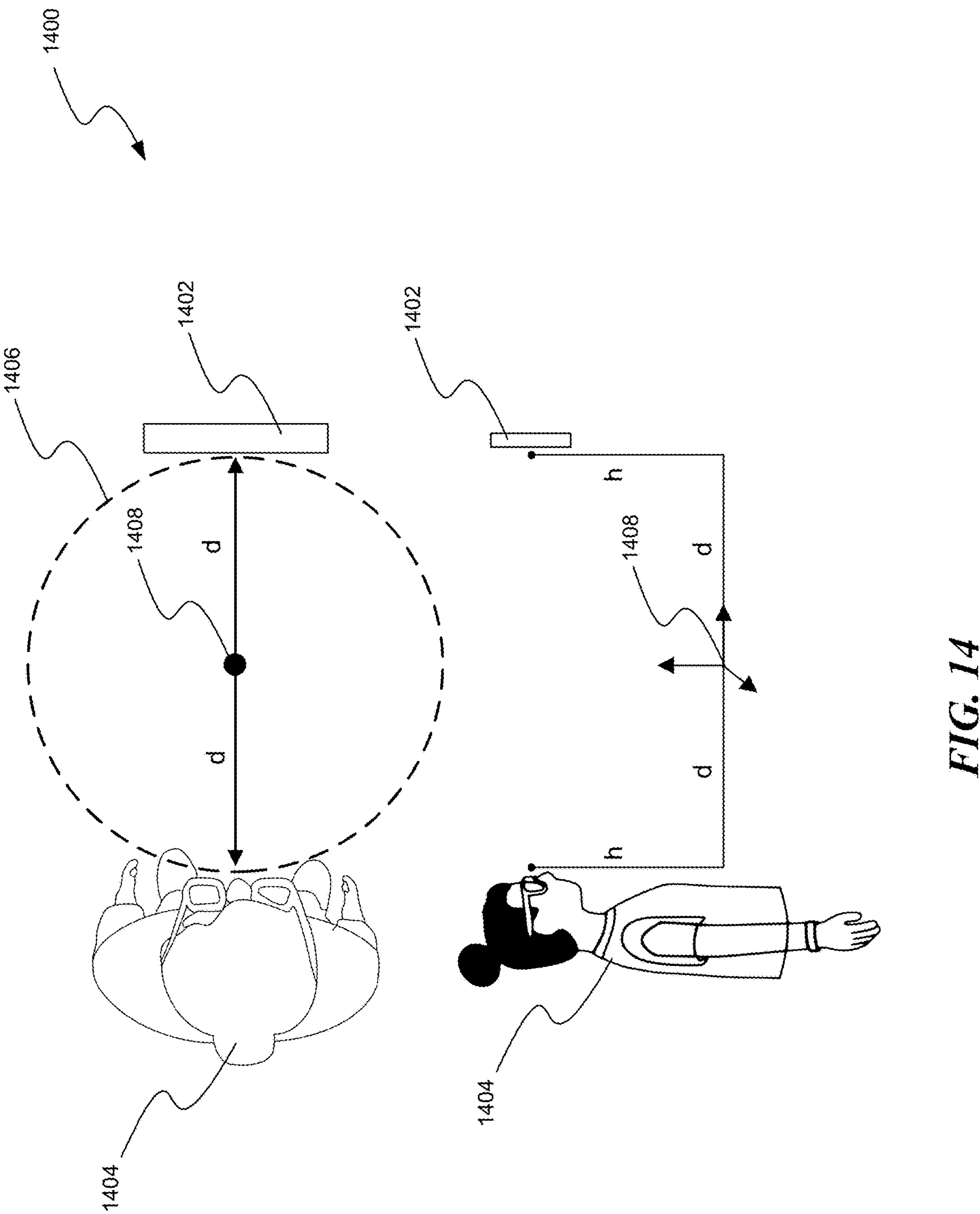
FIG. 14 is a conceptual diagram illustrating various aspects associated with spawning a two-dimensional image digital human representation in a spatial mode call.

FIG. 14 is a conceptual diagram 1400 illustrating various aspects associated with spawning a 2D image DHR 1402 in a spatial mode call. In examples, a 2D image DHR 1402 and an avatar DHR 1404 are spawned around the spawning circle 1406, the center of the spawning circle 1406 being the shared anchor 1408. Each of the DHR 1402 and DHR 1404 are placed at a distance "d" from the shared anchor. In examples, the height of the DHR 1402 can be based on a center portion of the DHR corresponding to the 2D image. Therefore, the spawning circle 1406 is placed such that the center of the DHR 1402 is a distance of "h" away from the spawning circle 1406.

Figure 15A:
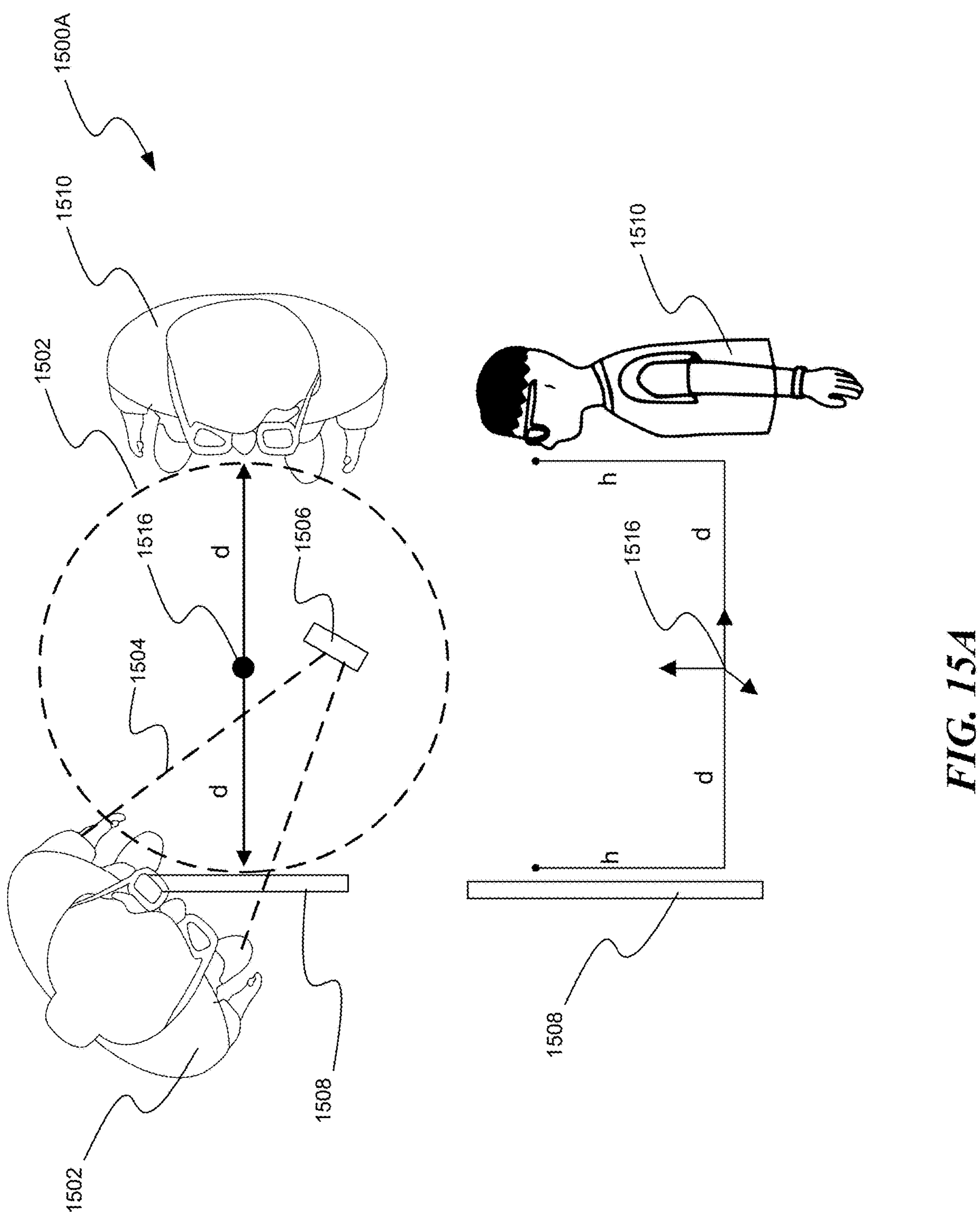
FIGS. 15A-15F are conceptual diagrams illustrating various aspects associated with spawning a video digital human representation in a spatial mode call.
Figure 15B:
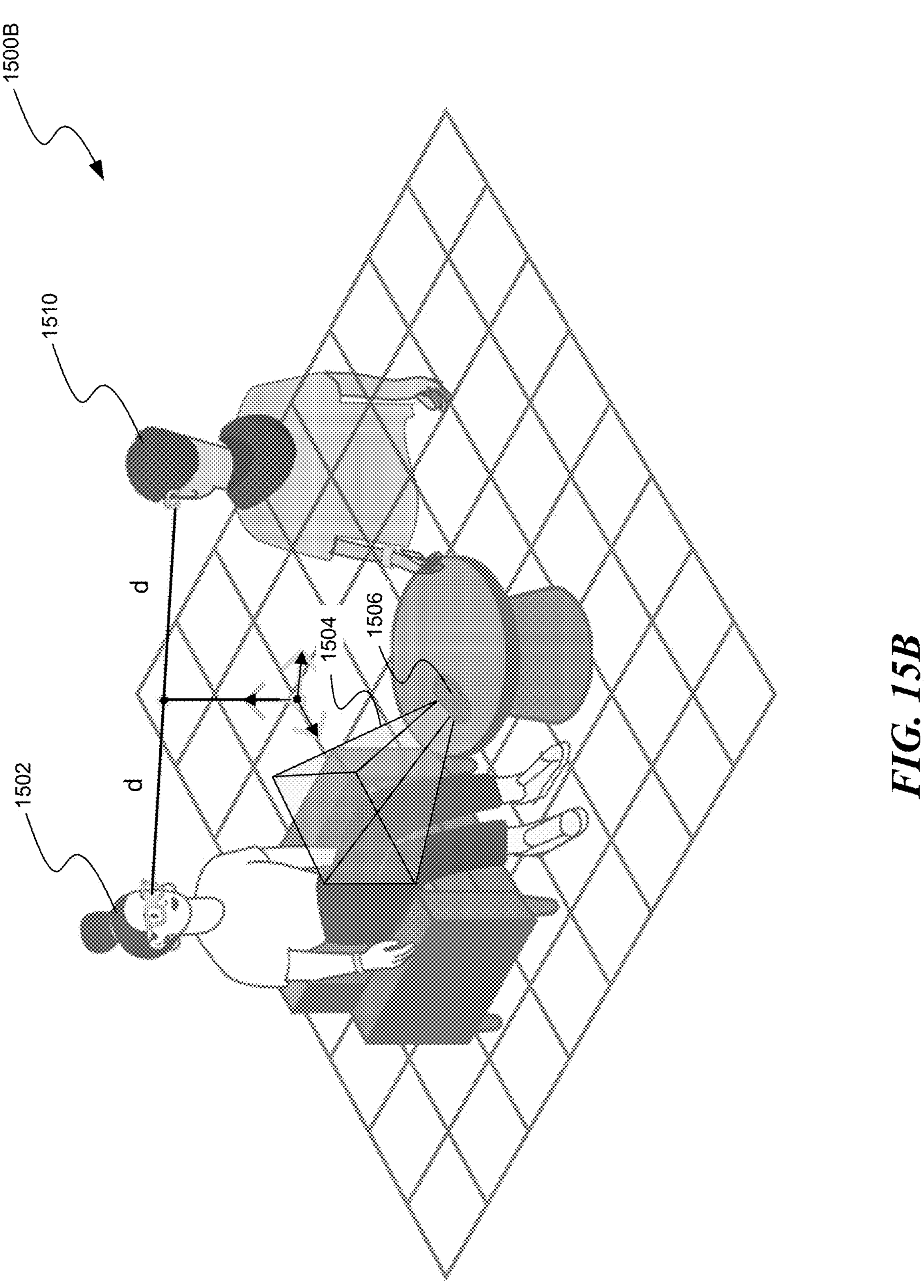
Figure 15C:
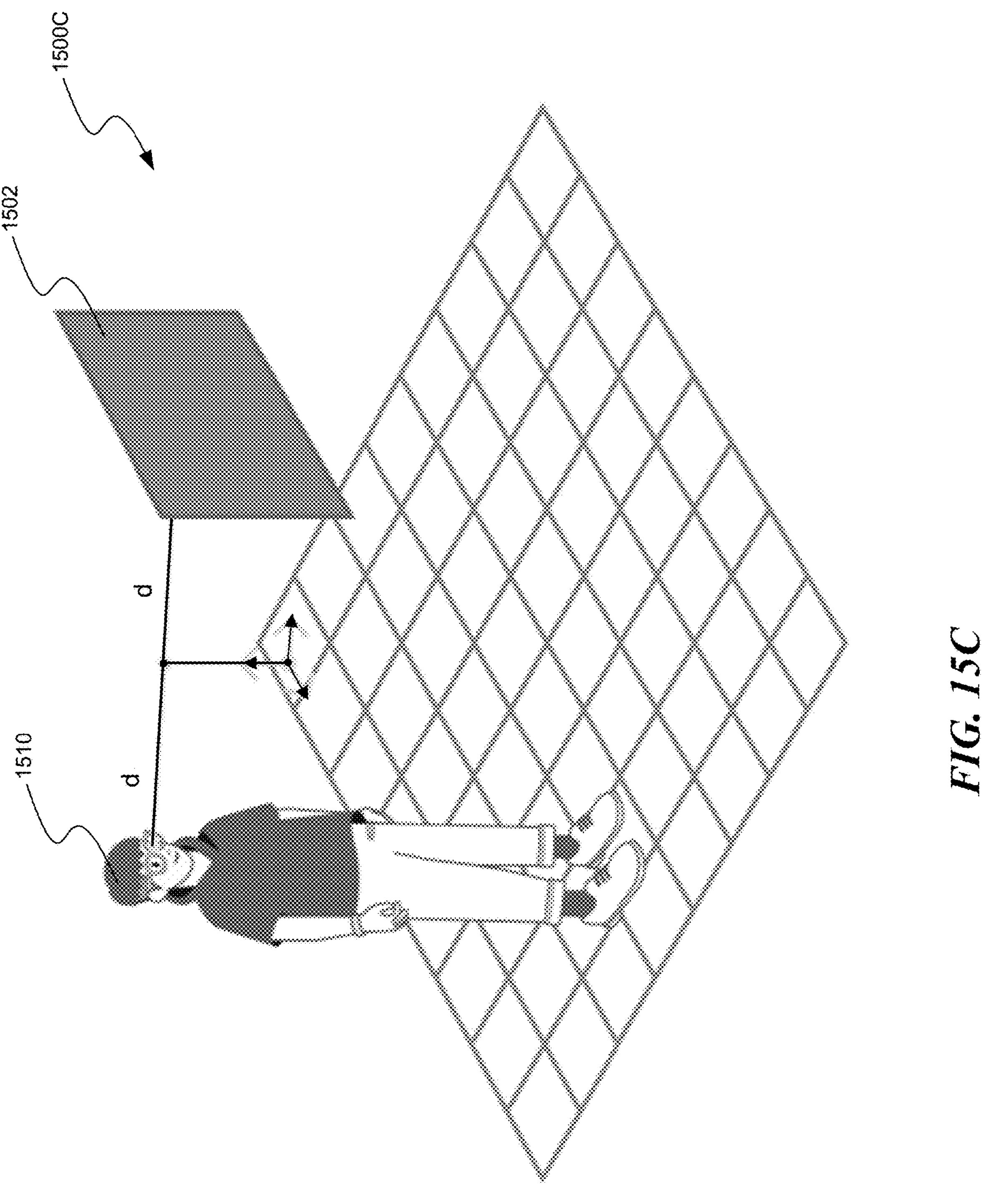

FIGS. 15A-15C are conceptual diagrams 1500A-1500C illustrating various aspects associated with spawning a video DHR in a spatial mode call. In examples, a user 1502 is within a field-of-view 1504 of a DHR experience system 1506. Accordingly, a video DHR 1508 and an avatar DHR 1510 can be spawned around the spawning circle 1512, the center of the spawning circle 1512 being the shared anchor 1516. Each of the DHR 1508 and DHR 1510 are placed at a distance "d" from the shared anchor. In examples, the height of the DHR 1508 can be based on a height of the user 1502 as determined by the location of the HMD. Therefore, the spawning circle 1512 is placed such that the height of the user 1502 (e.g., based on the center of the HMD) is a distance of "h" away from the spawning circle 1502. For example, as depicted in FIG. 15, the user 1502 is within the field-of-view 1504 of the DHR experience system 1506.

Figure 15D:
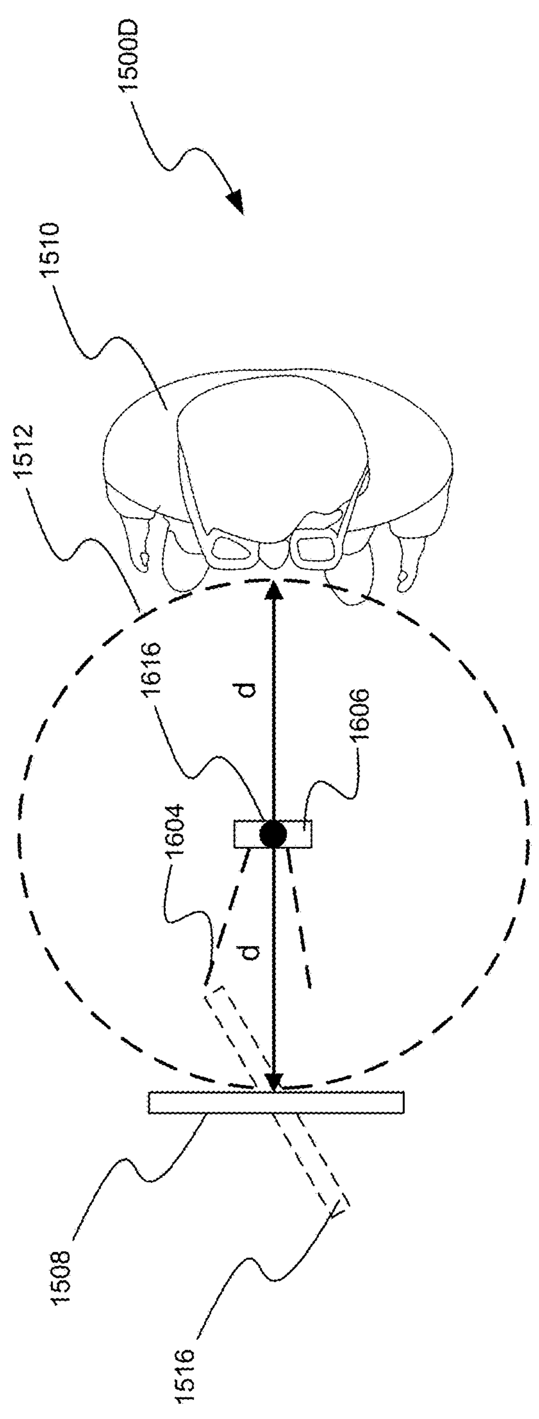
Figure 15D:
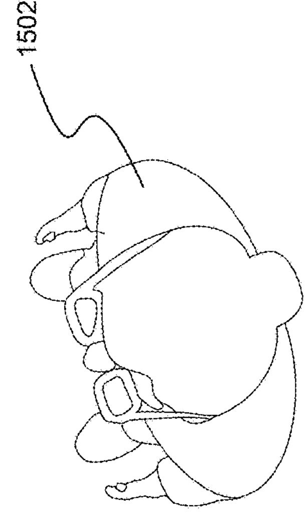
Figure 15E:
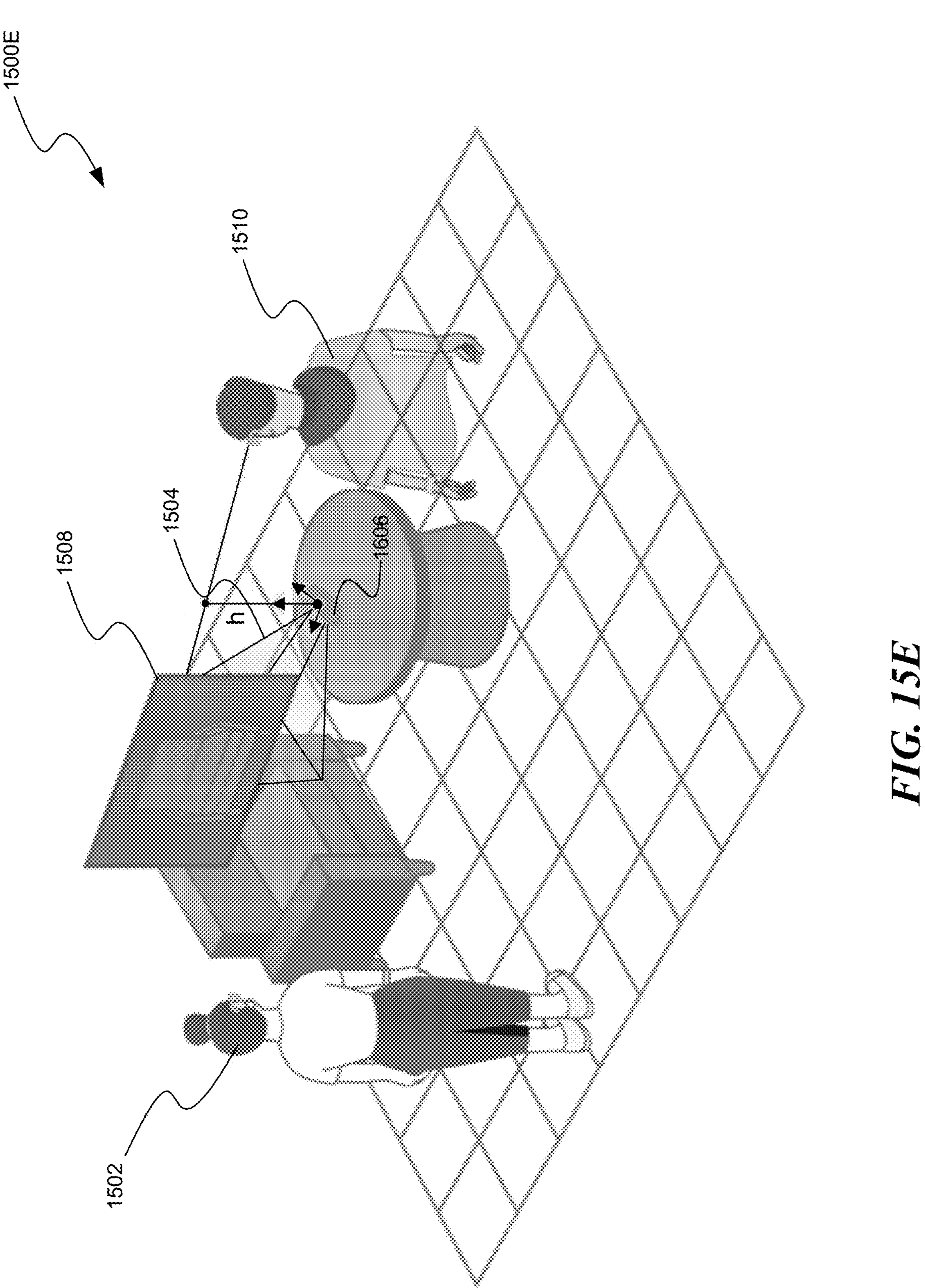
Figure 15F:
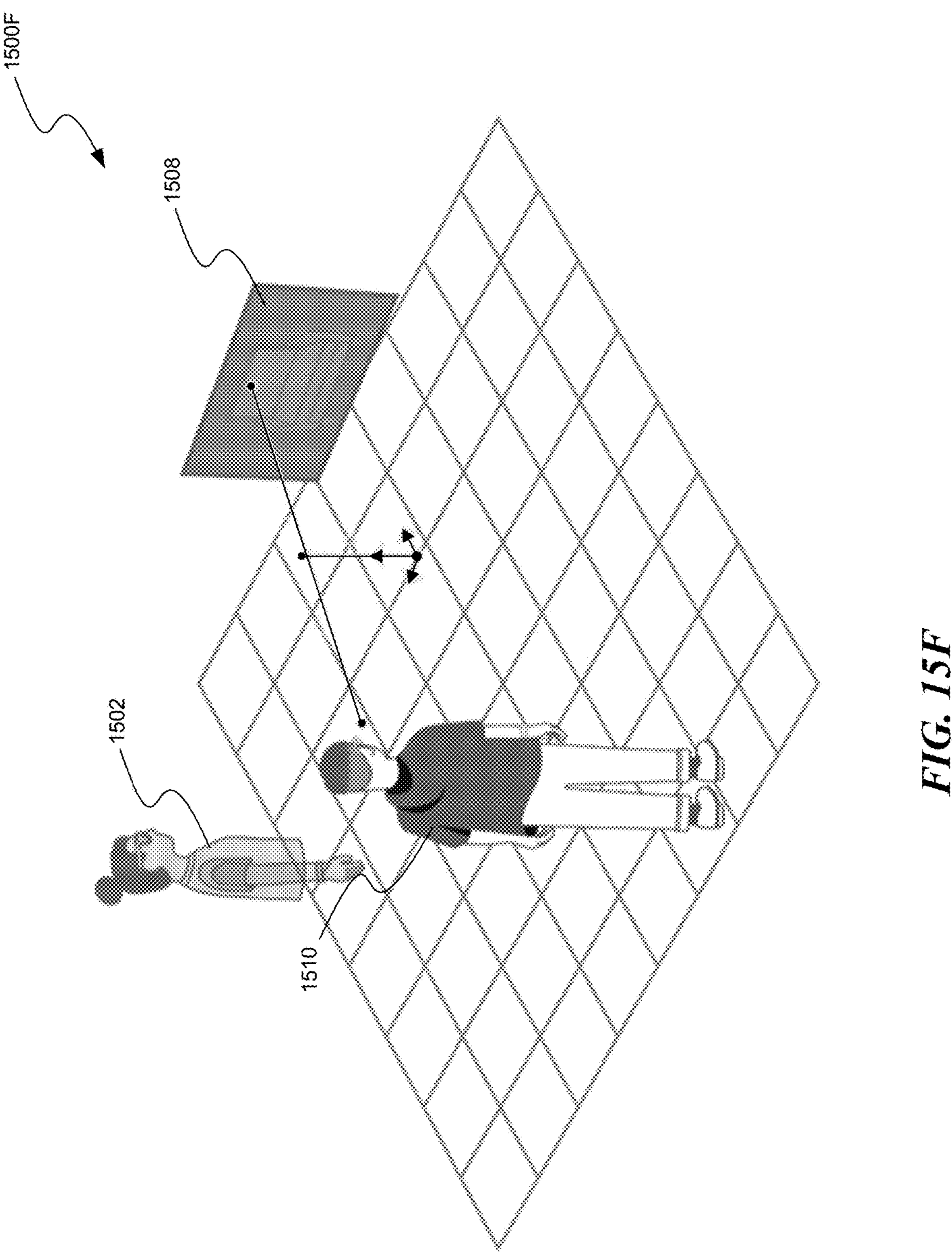

FIGS. 15D-15F are conceptual diagrams 1500D-F illustrating various aspects associated with spawning a video DHR in a spatial mode call. In examples, a user 1502 is not within a field-of-view 1504 of a DHR experience system 1506. Accordingly, a video DHR 1508 and an avatar DHR 1510 can be spawned around the spawning circle 1512, the center of the spawning circle 1512 being the shared anchor 1516. Each of the DHR 1508 and DHR 1510 are placed at a distance "d" from the shared anchor. In examples, the height of the DHR 1508 can be based on a height of the DHR experience system 1506. Therefore, the spawning circle 1512 is placed such that the height of the video DHR 1508 is a distance of "h" away from the spawning circle 1502, which corresponds to the height of the DHR experience system 1506. As further depicted in FIGS. 15E and 15F, a DHR 1510 can be a rotated version of the DHR 1508, and can be specific to the user 1502. That is, user 1502 can view the video DHR 1510, which can be a rotated version corresponding to the video DHR 1508.

Figure 16:
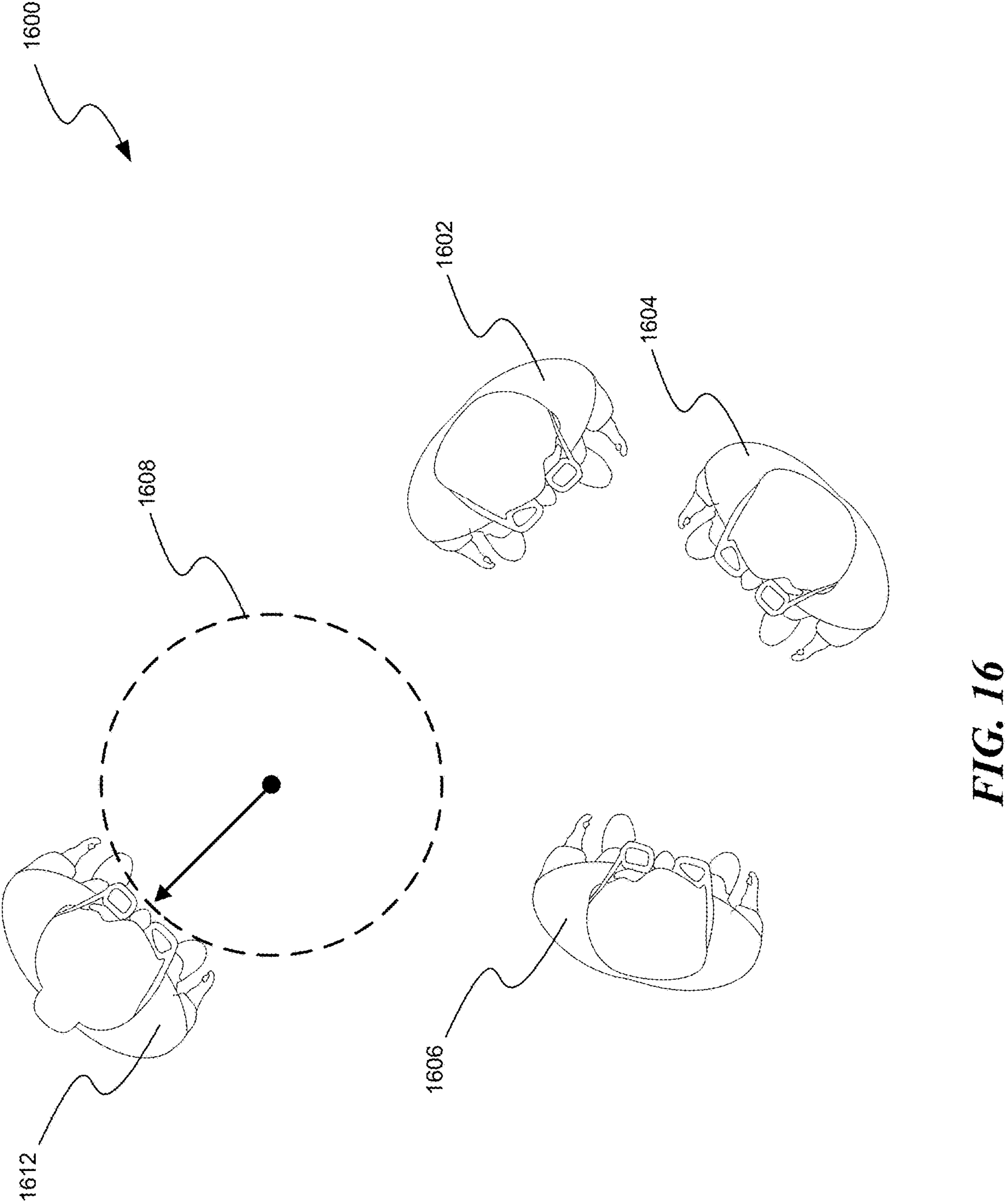
FIG. 16 is a conceptual diagram illustrating various aspects associated with spawning multiple digital human representations in a spatial mode call.

FIG. 16 is a conceptual diagram 1600 illustrating various aspects associated with spawning multiple DHRs in a spatial mode call. In examples, DHRs 1602, 1604, 1606, and 1612 can be initially spawned around the spawning circle 1608. However, each of the DHRs 1602, 1604, 1606, and 1612 are not locked to the spawning circle 1608; that is, each of the DHRs 1602, 1604, 1606, and 1612 can move freely within the XR environment. However, any time a DHR joins the XR environment, the newly joined DHR is spawned around the spawning circle 1608.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for spawning a digital human representation of a call receiver in an augmented call between a call sender and the call receiver, the method comprising:

initiating, by an artificial reality device of the call sender, the augmented call with an artificial reality device of the call receiver, wherein initiating the augmented call causes selection of a digital human representation type for the augmented call;

responsive to initiation of the augmented call, automatically rendering, by the artificial reality device of the call sender, the augmented call in a compact mode, wherein rendering the augmented call in the compact mode includes rendering the digital human representation of the call receiver, in the digital human representation type, body-leashed to the call sender, the digital human representation being rendered overlaid onto a view of a real-world environment of the call sender;

receiving, by the artificial reality device of the call sender, an indication to transition the augmented call to a spatial mode; and responsive to receiving the indication, transitioning the augmented call into the spatial mode, wherein:

transitioning the augmented call into the spatial mode includes rendering the digital human representation of the call receiver, in the digital human representation type, world-locked relative to a spatial anchor established for the real-world environment; and in the spatial mode, the digital human representation is rendered at a fixed vertical distance between the spatial anchor and the artificial reality device of the call sender.

2. The method of claim 1, wherein the digital human representation is scaled larger in the spatial mode than in the compact mode.

3. The method of claim 1, wherein the digital human representation is rendered as billboarded to the call sender and with rotation disabled relative to the call sender in the compact mode.

4. The method of claim 1, wherein the digital human representation type is a three-dimensional avatar, a video stream, or a two-dimensional image.

5. The method of claim 1, wherein the digital human representation is modifiable to be world-locked in the compact mode.

6. The method of claim 1, wherein the digital human representation type is selected automatically based on one or more determined capabilities of the artificial reality device of the call sender, the artificial reality device of the call receiver, or both.

7. The method of claim 1, wherein, in the spatial mode:

the digital human representation is rendered at a first location on a circumference of a spawning circle having a center at the spatial anchor, the call sender has a second location on the circumference of the spawning circle, and an orientation of the digital human representation toward the call sender is determined in accordance with the first location of the digital human representation relative to the second location of the call sender.

8. The method of claim 7, wherein a virtual object is rendered on the circumference of the spawning circle.

9. The method of claim 8, wherein a radius of the spawning circle is dynamic based on a size of the virtual object.

10. The method of claim 1, wherein the spatial anchor is shared between the artificial reality device of the call sender and the artificial reality device of the call receiver.

11. A non-transitory computer-readable storage medium storing instructions that, when executed by a computing system, cause the computing system to perform a process for spawning a digital human representation of a call receiver in an augmented call between a call sender and the call receiver, the process comprising:

initiating, by an artificial reality device of the call sender, the augmented call with a device of the call receiver;

responsive to initiation of the augmented call, automatically rendering, by the artificial reality device of the call sender, the augmented call in a compact mode, wherein rendering the augmented call in the compact mode includes rendering the digital human representation of the call receiver body-leashed to the call sender, the digital human representation being rendered overlaid onto a view of a real-world environment of the call sender; and responsive to receiving input, transitioning the augmented call into a spatial mode, wherein;

transitioning the augmented call into the spatial mode includes rendering the digital human representation of the call receiver world-locked relative to a spatial anchor established for the real-world environment; and in the spatial mode, the digital human representation is rendered at a fixed vertical distance between the spatial anchor and the artificial reality device of the call sender.

12. The non-transitory computer-readable storage medium of claim 11, wherein initiating the augmented call causes selection of a digital human representation type for the augmented call, and wherein the digital human representation of the call receiver is rendered in the digital human representation type.

13. The non-transitory computer-readable storage medium of claim 11, wherein initiating the augmented call causes selection of a digital human representation type for the call sender, and wherein a digital human representation of the call sender, in the digital human representation type, is transmitted to the device of the call receiver.

14. The non-transitory computer-readable storage medium of claim 13, wherein the digital human representation type is selected automatically based on one or more determined capabilities of the artificial reality device of the call sender, the artificial reality device of the call receiver, or both.

15. The non-transitory computer-readable storage medium of claim 11, wherein the device of the call receiver is an artificial reality device.

16. A computing system for spawning a digital human representation for a call receiver in an augmented call between a call sender and the call receiver, the computing system comprising:

one or more processors; and one or more memories storing instructions that, when executed by the one or more processors, cause the computing system to perform a process comprising:

initiating, by an artificial reality device of the call sender, the augmented call with a device of the call receiver;

responsive to initiation of the augmented call, automatically rendering, by the artificial reality device of the call sender, the augmented call in a compact mode, wherein rendering the augmented call in the compact mode includes rendering the digital human representation of the call receiver body-leashed to the call sender, the digital human representation being rendered overlaid onto a view of a real-world environment of the call sender; and responsive to receiving input, transitioning the augmented call into a spatial mode, wherein;

transitioning the augmented call into the spatial mode includes rendering the digital human representation of the call receiver world-locked relative to a spatial anchor established for the real-world environment; and in the spatial mode, the digital human representation is rendered at a fixed vertical distance between the spatial anchor and the artificial reality device of the call sender.

17. The computing system of claim 16, wherein initiating the augmented call causes selection of a digital human representation type for the augmented call, wherein the digital human representation of the call receiver is rendered in the digital human representation type, and wherein the device of the call receiver is an artificial reality device.

18. The computing system of claim 17, wherein, in the spatial mode:

the digital human representation is rendered at a first location on a circumference of a spawning circle having a center at the spatial anchor, the call sender has a second location on the circumference of the spawning circle, and an orientation of the digital human representation toward the call sender is determined in accordance with the first location of the digital human representation relative to the second location of the call sender.

19. The computing system of claim 18, wherein a virtual object is rendered on the circumference of the spawning circle.

20. The computing system of claim 17, wherein the digital human representation type is selected automatically based on one or more determined capabilities of the artificial reality device of the call sender, the artificial reality device of the call receiver, or both.

* * * * *